(12) United States Patent  
Kurimoto

(10) Patent No.: US 8,373,445 B2  
(45) Date of Patent: Feb. 12, 2013

(54) TRANSMISSION INPUT CIRCUIT

(75) Inventor: Mitsuhiro Kurimoto, Tokyo (JP)

(73) Assignee: Hochiki Corporation, Shinagawa-ku, Tokyo (JP)

( * ) Notice: Subject to any disclaimer, the term of this patent is extended or adjusted under 35 U.S.C. 154(b) by 82 days.

(21) Appl. No.: 13/122,184

(22) PCT Filed: Oct. 2, 2009

(86) PCT No.: PCT/JP2009/005102  
§ 371 (c)(1),  
(2), (4) Date: Apr. 1, 2011

(87) PCT Pub. No.: WO2010/038476  
PCT Pub. Date: Apr. 8, 2010

(65) Prior Publication Data  
US 2011/0175589 A1    Jul. 21, 2011

(30) Foreign Application Priority Data  
Oct. 2, 2008   (JP) ................................. 2008-257173

(51) Int. Cl.  
*H03K 5/153*    (2006.01)  
*H03K 5/22*    (2006.01)

(52) U.S. Cl. .................. 327/58; 327/60; 327/72; 327/77

(58) Field of Classification Search ........................ None  
See application file for complete search history.

(56) References Cited

U.S. PATENT DOCUMENTS

| | | | | |
|---|---|---|---|---|
| 5,266,884 A | * | 11/1993 | Agiman | 323/284 |
| 5,274,273 A | * | 12/1993 | Baginski et al. | 327/72 |
| 6,215,334 B1 | * | 4/2001 | Pernyeszi | 327/73 |
| 7,102,396 B2 | * | 9/2006 | Tsuchida et al. | 327/143 |
| 2005/0162207 A1 | * | 7/2005 | Kamei | 327/205 |

FOREIGN PATENT DOCUMENTS

| | | |
|---|---|---|
| JP | 62-276694 | 12/1987 |
| JP | 06-301876 | 10/1994 |
| JP | 09-091576 | 4/1997 |
| JP | 2004-102888 | 4/2004 |

OTHER PUBLICATIONS

International Search Report issued on PCT application No. PCT/JP2009/005102, mailed on Jan. 12, 2010.

* cited by examiner

*Primary Examiner* — Tuan T Lam  
(74) *Attorney, Agent, or Firm* — Wood, Herron & Evans, L.L.P.

(57) ABSTRACT

This transmission input circuit is provided with an adjustment processing section which turns ON a switch at an empty timing where transmission current from a slave device is not flowing, to allow a reference current to flow from a constant current circuit to a current detection resistor, generates in the current detection resistor a target adjustment voltage, in which a threshold voltage corresponding to the reference current is added to a load current detection voltage corresponding to the load current, and adjusts a digital value so that a reference voltage output from a digital variable resistor matches with the target adjustment voltage.

8 Claims, 19 Drawing Sheets

TRANSMISSION INPUT CIRCUIT

TECHNICAL FIELD

The present invention relates to a transmission input circuit provided in a master device such as a receiver device which detects transmission current from a slave device such as a fire hazard sensor which is connected thereto via a transmission line serving also as a power supply line.

Priority is claimed on Japanese Patent Application No. 2008-257173, filed Oct. 2, 2008, the contents of which are incorporated herein by reference.

BACKGROUND ART

In a conventional monitoring system, a sensor such as a fire hazard sensor and a gas sensor is connected from a receiver device to a transmission line to monitor for abnormalities such as a gas leakage (for example, refer to Patent Documents 1 and 2). In this monitoring system, a digital signal, which is a downstream signal such as control information, is transmitted in a voltage mode from the receiver device to a terminal. Meanwhile, the terminal transmits a digital signal, which is an upstream signal such as sensor information, in a current mode to the receiver device.

FIG. 15 shows the conventional monitoring system. As shown in the diagram, transmission lines 102a and 102b serving also as power supply lines are led out from a receiver device 100 serving as a master device, and an analog type sensor 104 and a relay device 106 serving as slave devices are connected thereto. To the analog type sensor 104 and the relay device 106, there are respectively set a unique address.

The analog type sensor 104 detects a concentration of smoke caused by a fire hazard occurrence or an analog value of the surrounding temperature, and transmits smoke concentration data or temperature data to the receiver device 100. The receiver device 100 determines the presence or absence of a fire hazard occurrence based on the smoke concentration data or the temperature data, and issues a fire hazard warning if a fire hazard occurrence is determined.

Sensor lines 108a and 108b are led out from the relay device 106, and a plurality of ON/OFF type sensors 110 which do not have a transmitting function, are connected thereto as loads. When the ON/OFF type sensor 110 detects an indication of a fire hazard occurrence, it allows an alarm current to flow to the relay device 106 via the sensor lines 108a and 108b. When the relay device 106 receives this alarm current, fire hazard alarm data is transmitted from the relay device 106 to the receiver device 100. Then, the receiver device 100 issues a fire hazard warning.

The receiver device 100 sequentially specifies a slave device address, and transmits a polling downstream signal to respective slave devices (the analog type sensor 104 and the relay device 106) in a voltage mode. The slave device which has received this polling downstream signal distinguishes its own address, and returns a transmission current serving as an upstream signal which indicates a normal state, to the receiver device 100.

FIG. 16 is a diagram which shows, with an equivalent circuit, the receiver device 100, the analog type sensor 104, and the relay device 106 in the conventional system shown in FIG. 15. The relay device 106 supplies electric power to the ON/OFF type sensors 110 connected thereto as a load, to thereby steadily supply operating current, and therefore, the ON/OFF type sensors 110 can be treated as the load 122 illustrated as a resistor. Therefore, a load current Iz according to the load 122, steadily flows to the transmission lines 102a and 102b.

The analog type sensor 104 is provided with a constant current source 112 and a switch 114. In the analog type sensor 104, for example, with respect to the polling from the receiver device 100, a CPU 116 returns an upstream signal indicating normality to the receiver device 100 as a current pulse signal of a predetermined bit length.

The current pulse signal transmitted from the analog type sensor 104 is input to a transmission input circuit 118 of the receiver device 100, and a current detection voltage pulse signal proportional to this current pulse signal is generated and transmitted to a CPU 120. As a result, the CPU 120 which has read the current detection voltage pulse signal recognizes the analog type sensor 104 as being normal. That is to say, in a state where the load current Iz flows from the load 122 to the transmission lines 102a and 102b serving also as power supply lines, the transmission input circuit 118 detects the presence or absence of transmission current from the analog type sensor 104 serving as a slave device.

FIG. 17 is a circuit diagram of the conventional transmission input circuit 118 provided in the receiver device 100 shown in FIG. 16. In FIG. 17, in the transmission input circuit 118, a predetermined power supply voltage Vc is applied to the transmission line 102a, while the signal line 102b side is connected to a current detection resistor R11 via a diode D11.

As shown in FIG. 15, the relay device 106 and the analog type sensor 104 are connected to the transmission lines 102a and 102b, and the load current Iz dependant on the load 122 of the relay device 106 flows at an empty timing where no transmission current Ia is flowing. When the analog type sensor 104 outputs a transmission signal, the transmission current Ia with the load current Iz added thereto flows.

A detection voltage according to the line current which is produced at both ends of the current detection resistor R11 shown in FIG. 17 is applied to the negative input terminal of a comparator 122. A capacitor C11 is connected to the positive input terminal of the comparator 122, and the capacitor C11 is further connected to the input side of the diode D11 via a switch SW11.

The switch SW11 is switched by the CPU 120 at an empty timing where transmission current Ia from the slave devices such as the analog type sensor 104 is not flowing, and it sample-holds in the capacitor C11, a reference voltage Vr, in which a threshold voltage Vf serving as a forward drop voltage of the diode D11 is added to a load current detection voltage Vz of the current detection resistor R11. That is to say, it sample-holds Vr=(Vz+Vf) as a reference voltage Vr.

FIG. 18 is a time chart showing a signal waveform of each section in FIG. 17. FIG. 18(A) shows the input voltage of the comparator 122, and FIG. 18(B) shows the timing of sampling of the capacitor C11 performed by the switch SW11.

As shown in FIG. 18(A), in a state where the transmission current Ia is not present, a load current detection voltage Vz due to the load current Iz flowing through the transmission lines 102a and 102b, is input as a base voltage. Moreover, with switching of the switch SW1 at an empty timing with no transmission current Ia, a reference voltage Vr, in which the threshold voltage Vf serving as the forward drop voltage of the diode D11 is added to the load current detection voltage Vz of the current detection resistor R11, is sample-held in the capacitor C11.

When the transmission current Ia flows due to transmission of a transmission signal from a slave device, at the current detection resistor R11 there is produced a transmission cur-rent detection voltage Va corresponding to the transmission current Ia, having the load current detection voltage Vz added thereto. The comparator 122 extracts a reception voltage component (voltage pulse component) which exceeds the reference voltage Vr=(Vz+Vf) held in the capacitor C11, and inputs this as a transmission current detection signal to the CPU 120 which then performs a fire hazard warning process or the like.

FIG. 19 is a time chart shown with the time axis of FIG. 18 contracted. Pulse signals are transmitted with the transmission current Ia from the slave device side at a constant cycle, and at an empty timing thereof, a reference voltage Vr=(Vz+Vf), in which a threshold voltage Vf serving as a forward drop voltage of the diode D11 is added to a load current detection voltage Vz, is sample-held in the capacitor C11. Then, a voltage component which exceeds the reference voltage Vr of a transmission current detection voltage Va obtained immediately thereafter is detected, and input to the CPU 120 as a transmission current detection signal.

Although the load voltage Vz corresponding to the load current Iz is shown as a constant voltage, the load current Iz gently changes according to the environment temperature and the like.

[Prior Art Documents]
[Patent Documents]
  [Patent Document 1] Japanese Unexamined Patent Application, First Publication No. H09-91576
  [Patent Document 2] Japanese Unexamined Patent Application, First Publication No. H06-301876

Problems to be Solved by the Invention

In the conventional transmission input circuit, the threshold voltage Vf for detecting a transmission current from a slave device is determined, depending on the forward voltage Vf of the diode D11. Therefore there is a problem in that an arbitrary threshold value cannot be set. Moreover variation therein caused by temperature is significant, and a sufficient level of reliability cannot be ensured.

Furthermore, the reference voltage Vr, in which the threshold voltage Vf serving as the forward drop voltage of the diode D11 is added as an analog voltage, is held in the capacitor C11, and the voltage held in the capacitor C11 changes over time due to leakage current and so forth. Consequently, there is a problem in that sample-holding needs to be performed frequently.

Disclosure Of Invention

The present invention takes into consideration the above circumstances, with an object of providing a transmission input circuit in which a threshold voltage for detecting transmission current can be arbitrarily set, and variation associated with temperature or elapse of time will not occur therein, enabling an accurate detection of the presence or absence of transmission current from a slave device.

Means for Solving the Problem

In order to solve the above problems and achieve the object, the present invention employs following measures.

(1) The transmission input circuit of the present invention is a transmission input circuit of a master device which, in a state where a load current from a load is flowing into a transmission line serving also as a power supply line, detects the presence or absence of a transmission current from a slave device, the transmission input circuit comprising: a current detection resistor which receives input of a line current flowing through the transmission line and generates a line current detection voltage; a switch which, by performing switching, allows a predetermined reference current from a constant current circuit to flow to the current detection resistor and generate a threshold voltage; a digital variable resistor circuit which sets a resistance value according to a digital value to thereby generate an arbitrary reference voltage; a comparator which receives an input of the line current detection voltage generated by the current detection resistor, to one input terminal, receives an input of the reference voltage generated by the digital variable resistor circuit to an other input terminal, and outputs a component of the line current detection voltage which exceeds the reference voltage, as a transmission current detection signal; and an adjustment processing section which turns ON the switch at an empty timing where the transmission current from the slave device is not flowing, to allow the reference current to flow from the constant current circuit to the current detection resistor, generates in the current detection resistor a target adjustment voltage, in which a threshold voltage corresponding to the reference current is added to a load current detection voltage corresponding to the load current, and adjusts the digital value so that the reference voltage output from the digital variable resistor matches with the target adjustment voltage.

(2) In the transmission input circuit according to (1) above, there may be employed a configuration such that: the digital variable resistor circuit is provided with a single digital variable resistor having a series resistor array, to both ends of which a predetermined internal power supply voltage is applied, and having a wiper terminal which outputs a voltage input from the adjustment processing section and varied according to the digital value; and the adjustment processing section adjusts the digital value to be given to the digital variable resistor to a digital value at which the output of the comparator is inverted with a 1-bit change, or to a digital value immediately before the inversion.

(3) In the transmission input circuit according to (2) above, there may be employed a configuration such that: in a case where the output of the comparator at the time of adjustment start is a high level, the adjustment processing section changes the digital value by a 1-bit unit in the direction of inverting this high level to a low level, and adjusts the digital value to be given to the digital variable resistor to a digital value at the time when the high level is inverted to a low level, or to a digital value immediately before the inversion; and in a case where the output of the comparator at the time of the adjustment start is a low level, the adjustment processing section changes the digital value by a 1-bit unit in the direction of inverting this low level to a high level, and adjusts the digital value to be given to the digital variable resistor to a digital value at the time when the low level is inverted to a high level, or to a digital value immediately before the inversion.

(4) In the transmission input circuit according to (1) above, there may be employed a configuration such that the digital variable resistor circuit is provided with: a first digital variable resistor for coarse adjustment having a first series resistor array, to both ends of which a predetermined internal power supply voltage is applied, and having a first wiper terminal which outputs a voltage input from the adjustment processing section and varied according to the digital value; a second digital variable resistor for fine adjustment having a second series resistor array, to both ends of which the predetermined internal power supply voltage is applied, and having a second wiper terminal which outputs a voltage input from the adjustment processing section and varied according to the digital value; a first resistor provided in a line which connects the first wiper terminal to the other input terminal of the comparator; and a second resistor which is provided in the line connecting the second wiper terminal to the other input terminal of the comparator, and which has a resistance value greater than that of the first resistor, and wherein the adjustment processing section adjusts the digital value to be given to the first digital variable resistor so that the reference voltage and the target adjustment voltage match with each other, and thereafter also adjusts the digital value to be given to the second digital variable resistor so that the reference voltage and the target adjustment voltage match with each other.

(5) In the transmission input circuit according to (4) above, there may be employed a configuration such that when adjusting the first digital variable resistor, the adjustment processing section fixes a position of the second wiper terminal of the second digital variable resistor at a middle point position.

(6) In the transmission input circuit according to (1) above, there may be employed a configuration such that the digital variable resistor circuit is provided with: a first digital variable resistor for coarse adjustment having a first series resistor array, to both ends of which a predetermined internal power supply voltage is applied, and having a first wiper terminal which outputs a voltage input from the adjustment processing section and varied according to the digital value; a second digital variable resistor for fine adjustment having a second series resistor array, to both ends of which the predetermined internal power supply voltage is applied, and having a second wiper terminal which outputs a voltage input from the adjustment processing section and varied according to the digital value; a first resistor provided in a line which connects the first wiper terminal to the other input terminal of the comparator; and a second resistor which is provided in the line connecting the second wiper terminal to the other input terminal of the comparator, and which has a resistance value greater than that of the first resistor; a first inverter, an input of which is connected to the adjustment processing section, and an output of which is connected to a ground side terminal of the second series resistor array; a second inverter which is input-connected to the output from the first inverter, and which is output-connected, via a third resistor having a resistance value twice that of the second resistor, to the other input terminal of the comparator; and a fourth resistor which is connected between the other input terminal of the comparator and the ground, and which has a resistance value twice that of the second resistor, wherein: the adjustment processing section adjusts the digital value to be given to the first digital variable resistor so that the reference voltage and the target adjustment voltage match with each other, and thereafter adjusts the digital value to be given to the second digital variable resistor so that the reference voltage and the target adjustment voltage match with each other; the adjustment processing section also inputs, while adjusting the resistance value of the first digital variable resistor, a low level signal to the first inverter and obtains a high level signal output serving as the internal power supply voltage, to thereby apply the internal power supply voltage to the second resistor via the first digital variable resistor, and forms a circuit which is formed by serially connecting a parallel circuit including the third resistor and the fourth resistor to the second resistor, by connecting the third resistor to the ground side, based on a low level signal output from the second inverter, and thereby setting the voltage at the serial connection point to the same value as the output voltage at the time when the second wiper terminal is positioned at the middle point position; and the adjustment processing section also inputs, while adjusting the resistance value of the second digital variable resistor, a high level signal to the first inverter and obtains a low level signal output, thereby enabling an adjustment while one end of the second digital variable resistor is connected to the ground side, and obtains a high level signal output from the second inverter to form a circuit in which the third resistor and the fourth resistor are serially connected between the internal power supply voltage and the ground, and thereby setting the voltage at the serial connection point between the third resistor and the fourth resistor to a half of the internal power supply voltage.

(7) Another transmission input circuit of the present invention is a transmission input circuit of a master device which, in a state where a load current from a load is flowing into a transmission line serving also as a power supply line, detects the presence or absence of transmission current from a slave device, the transmission input circuit comprising: a current detection resistor which receives input of line current flowing through the transmission line and generates a line current detection voltage; a switch which, by performing switching, allows a predetermined reference current from a constant current circuit to flow to the current detection resistor and generate a threshold voltage; a DA converter which generates an arbitrary reference voltage according to a digital value; a comparator which receives input of the line current detection voltage generated by the current detection resistor, to one input terminal, receives input of the reference voltage generated by the DA converter to an other input terminal, and outputs a component of the line current detection voltage which exceeds the reference voltage, as a transmission current detection signal; and an adjustment processing section which turns the switch ON at an empty timing where the transmission current from the slave device is not flowing, to allow the reference current to flow from the constant current circuit to the current detection resistor, generates in the current detection resistor a target adjustment voltage, in which a threshold voltage corresponding to the reference current is added to the load current detection voltage corresponding to the load current, and adjusts the digital value so that the reference voltage output from the DA converter matches with the target adjustment voltage.

(8) In the transmission input circuit according to either one of (1) and (7) above, there may be employed a configuration such that the constant current circuit supplies the reference current which generates a threshold voltage being ½ of the transmission current detection voltage corresponding to the transmission current.

EFFECT OF THE INVENTION

According to the transmission input circuit of the present invention, in a state where the load flows the load current to the transmission line, the digital variable resistor sets the reference voltage for detecting the presence or absence of a transmission current from a slave device, with respect to the comparator. As a result it is possible to accurately detect a transmission current transmitted from the slave device without the reference voltage changing over time, compared to the conventional configuration in which a capacitor performs sample-holding.

Moreover, since the reference voltage set by the digital variable resistor does not change, the digital variable resistor does not require adjustment, or the frequency of adjustment made thereto can be significantly reduced, as long as the load current detection voltage is constant. Accordingly, it is possible to reduce the load on the process for adjusting the reference voltage.

Furthermore, in the case where the load current varies, with an adjustment in the digital variable resistor using an empty timing where the transmission current is not flowing, it is possible to accurately detect a transmission current without being influenced by variation in the load current.

Moreover, by providing the first digital variable resistor for coarse adjustment and the second digital variable resistor for fine adjustment, and adjusting the reference voltage in two stages, namely a coarse adjustment and a fine adjustment, it is possible to reduce the processing time required for a single adjustment of the digital variable resistor.

Furthermore, in the case where the first digital variable resistor for coarse adjustment and the second digital variable resistor for fine adjustment are provided, by fixing the position of the second wiper terminal of the second digital variable resistor for fine adjustment at a middle point position when performing a coarse adjustment, it is possible to prevent a situation in which a coarse adjustment cannot be performed by the first digital variable resistor (that is, a situation in which the reference voltage cannot be adjusted to the target adjustment voltage).

Moreover, when performing a coarse adjustment, by equivalently realizing the process of fixing the position of the second wiper terminal of the second digital variable resistor for fine adjustment at a middle point position, with a combination of a logical circuit and a resistor using two inverters (the first inverter and second inverter) rather than by adjusting the second digital variable resistor, it is possible to easily perform an adjustment process at high speed.

BEST MODE FOR CARRYING OUT THE INVENTION

Hereunder, each embodiment of a transmission input circuit of the present invention is described, with reference to the drawings. Common constituents in the respective embodiments are given the same reference symbols, and overlapping descriptions thereof are omitted.

[First Embodiment]

Figure 1:
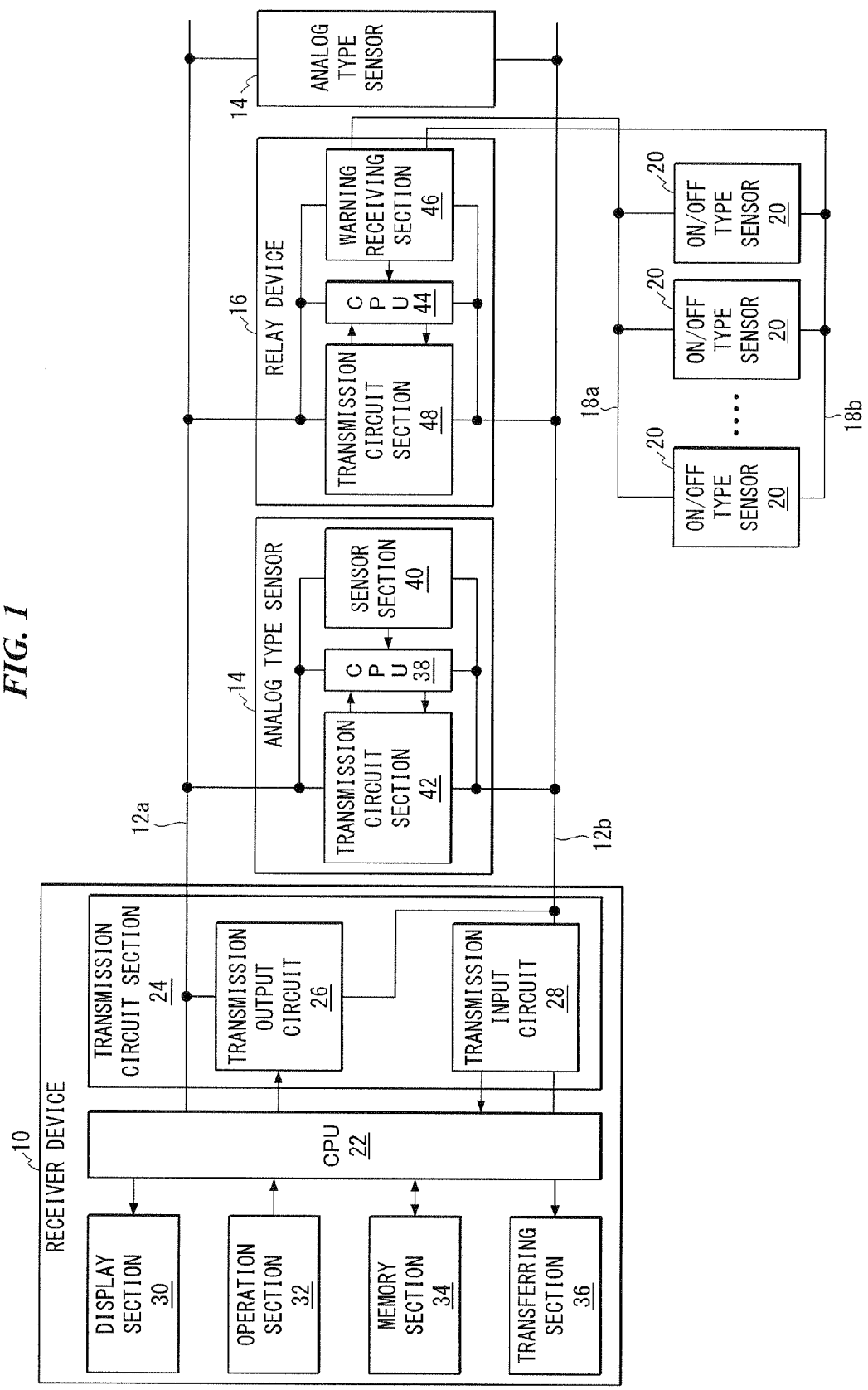
FIG. 1 is a block diagram showing a receiver device together with an analog type sensor and a relay device, in a monitoring system to which the present invention is applied.

FIG. 1 is a block diagram showing a configuration of a receiver device together with an analog type sensor and a relay device, in a monitoring system to which the present invention is applied. In FIG. 1, in the monitoring system to which the present invention is applied, an analog type sensor 14 and a relay device 16 serving as slave devices are severally connected to transmission lines 12a and 12b which are led out from a receiver device 10 serving as a master device, towards a monitoring area.

The analog type sensor 14 and the relay device 16 are provided with a transmission function which transmits and receives upstream signals and downstream signals to and from the receiver device 10. A unique address with a maximum of 127 addresses per transmission line, is preliminarily assigned to the analog type sensor 14 and to the relay device 16.

The analog type sensor 14 detects a concentration of smoke (smoke concentration) occurring due to a fire hazard or a temperature (room temperature for example), and transmits the detected value to the receiver device 10 as analog data. Meanwhile, on the receiver device 10 side, the presence or absence of a fire hazard occurrence is determined based on the received analog data of the smoke concentration or temperature, and a warning is issued if an occurrence of a fire hazard is determined The relay device 16 is provided so as to connect a plurality of ON/OFF type sensors 20, which do not have a transmission function, to the transmission lines 12a and 12b. The relay device 16 has a function to perform transmission to and from the receiver device 10. Each of the ON/OFF type sensors 20 is connected to sensor lines 18a and 18b led out from the relay device 16. The ON/OFF type sensor 20, when a fire hazard is detected, supplies an alarm current between the sensor lines 18a and 18b, and this alarm current is received by the relay device 16, and fire hazard alarm data indicating a fire hazard occurrence is transmitted to the receiver device 10.

Downstream signals transmitted from the receiver device 10 to the analog type sensor 14 and the relay device 16 serving as slave devices, are transmitted in a voltage mode. For example, the receiver device 10 sequentially specifies a slave device address at a constant polling cycle, and transmits a polling signal. This polling signal is transmitted as a voltage pulse which varies the voltage between the transmission lines 12a and 12b between 18 volt and 30 volt for example.

On the other hand, upstream signals transmitted from the analog type sensor 14 and the relay device 16 to the receiver device 10, are transmitted in a current mode. That is to say, a signal current is supplied between the transmission lines 12a and 12b at the timing of bit 1 of the transmission data, and an upstream signal is transmitted to the receiver device 10 as a so-called current pulse sequence, and transmission current flows at this time.

The transmission lines 12a and 12b are also used as power supply lines for the analog type sensor 14 and the relay device 16 serving as slave devices. That is to say, in the transmission lines 12a and 12b, the supply voltage is varied in a range between 18 volt and 30 volt at the time of downstream signal transmission in the voltage mode, and at least voltage supply at 18 volt is performed. That is to say, power supply is continuously performed from the receiver device 10 serving as a master device to the analog type sensor 14 and the relay device 16 serving as slave devices.

Electric power supplied through the transmission lines 12a and 12b is also supplied via the relay device 16 to the sensor lines 18a and 18b led out from the relay device 16. As a result, electric power is supplied to each of the ON/OFF type sensors 20 via the sensor lines 18a and 18b.

In the receiver device 10, there are provided a CPU 22 and a transmission circuit section 24 corresponding to the CPU 22. Moreover, the transmission lines 12a and 12b are led out from the transmission circuit section 24.

In the transmission circuit section 24 there are provided a transmission output circuit 26 and a transmission input circuit 28 according to one embodiment of the present invention. The transmission output circuit 26 outputs a downstream signal to the transmission lines 12a and 12b in the voltage mode, based on a command instruction such as a polling instruction from the CPU 22.

When the transmission input circuit 28 receives an upstream signal transmitted in the current mode from the analog type sensor 14 or the relay device 16 serving as a slave device, that is, a transmission current, it outputs a transmission current detection signal indicating this reception to the CPU 22, which makes the CPU 22 perform a fire hazard warning operation.

In the receiver device 10, to correspond to the CPU 22, there are provided a display section 30, an operation section 32, a memory section 34, and a transferring section 36, and various types of operations required for fire hazard monitoring including; warning output, warning display, operation, memorizing monitoring information, and information transfer signal output, can be performed.

In the analog type sensor 14, there are provided a CPU 38, a sensor section 40, and a transmission circuit section 42. The sensor section 40 detects a concentration of smoke (smoke concentration) occurring due to a fire hazard occurrence, or a temperature, and outputs it to the CPU 38.

The transmission circuit section 42 receives a downstream signal of a polling command which specifies its own address from the receiver device 10, and if the CPU 38 determines normality, an upstream signal indicating normality is transmitted to the receiver device 10 in the current mode. When a fire hazard is detected, the CPU 38 transmits a fire hazard alarm signal, which is a fire hazard interruption upstream signal, to the receiver device 10 so as to respond to the polling command which has specified its own address.

In the relay device 16, there are provided a CPU 44, an alarm receiving section 46, and a transmission circuit section 48. The sensor lines 18a and 18b are led out from the alarm receiving section 46, and each ON/OFF type sensor 20 is connected as a load to these sensor lines 18a and 18b.

When the ON/OFF type sensor 20 detects a fire hazard occurrence, an alarm current is supplied between the sensor lines 18a and 18b, and the alarm receiving section 46 receives this alarm current and outputs it to the CPU 44. Consequently, by means of the transmission circuit 48, the CPU 44 transmits a fire hazard interruption upstream signal to the receiver device 10 so as to respond to the polling command, which has specified its own address.

As with the analog type sensor 14, when a downstream signal of the polling command from the receiver device 10 specifying its own address is received, the relay device 16 also transmits an upstream signal indicating normality to the receiver device 10 in the current mode if there is no abnormality.

Hereunder is a detailed description of a transmission process performed between the receiver device 10 and slave devices.

When normal monitoring is being performed, the receiver device 10 is transmitting a polling command for normal monitoring which sequentially specifies the address of the slave device. The analog type sensor 14 and the relay device 16 perform a normal monitoring response when a polling command which matches their own set address is received. Accordingly, based on the presence or absence of a response to the polling command, the receiver device 10 can detect the presence or absence of failure in the analog type sensor 14 or the relay device 16.

The analog type sensor 14 receives a batch AD conversion command which is repeatedly output at a cycle of polling command transmission of the receiver device 10, to all of the sensor addresses. When it is received, the analog type sensor 14, by means of a fire hazard detection mechanism (sensor section 40) provided therein, samples analog detection data such as smoke concentration and temperature, compares it with a pre-defined fire hazard level, and determines a fire hazard occurrence if it exceeds this fire hazard level.

In the analog type sensor 14, when a fire hazard occurrence is determined from the sampling result based on the batch AD conversion command, it transmits a fire hazard interruption signal to the receiver device 10 at the subsequent polling command transmission timing which specifies its own sensor address. As the fire hazard interruption signal, there is used a signal which is not normally used such as one which sets all response bits to 1.

The relay device 16 also samples the state of reception performed by the alarm receiving section 46 based on the batch AD conversion command from the receiver device 10. When the alarm reception is detected, the relay device 16 transmits an interruption signal to the receiver device 10 at the subsequent timing where a polling command which specifies its own sensor address is transmitted.

When the receiver device 10 receives the fire hazard interruption signal from the analog type sensor 14 or the relay device 16, it issues a group search command, and receives a fire hazard interruption response from the group including the analog type sensor 14 or the relay device 16 which has detected a fire hazard, to thereby determine the group. Subsequently, the receiver device 10 sequentially specifies the address of each of the analog type sensor 14 and the relay device 16 included in the determined group, performs polling with respect thereto, and receives a fire hazard response (analog data or fire hazard alarm data), to thereby recognize the sensor address of the analog type sensor 14 or the relay device 16 which has detected the fire hazard, and perform a fire hazard warning operation.

The analog type sensors 14 and the relay devices 16 of a maximum 127 units connected to the transmission lines 12a and 12b have a group address set to each 8 units thereof for example. With respect to the group search command transmitted from the receiver device 10, there is performed a fire hazard interruption response from the group which includes the analog type sensor 14 which has detected the fire hazard occurrence. Thereby, it is possible to identify the group which contains the analog type sensor 14 or the relay device 16 which has detected the fire hazard occurrence.

Figure 2:
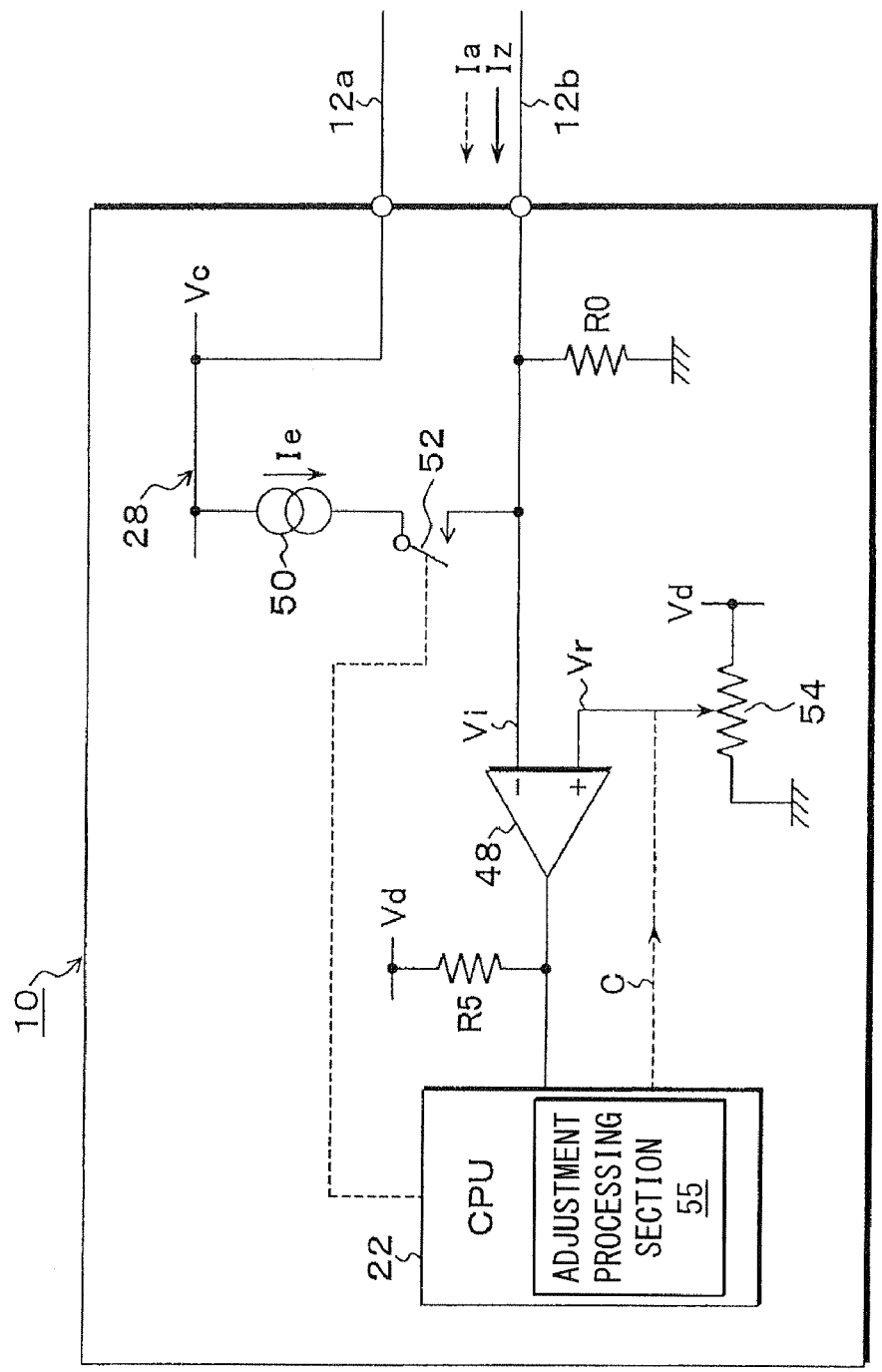
FIG. 2 is a circuit diagram of the receiver device provided with a transmission input circuit according to a first embodiment of the present invention.

FIG. 2 is a circuit diagram showing a configuration of the transmission input circuit 28 according to the present embodiment. As shown in FIG. 2, the transmission input circuit 28 provided in the receiver device 10 is provided with; a current detection resistor R0, a comparator 48, a constant current circuit 50, a switch 52 using a transistor, MOS-FET, or the like, a digital variable resistor 54, and a pull-up resistor R5.

Among the transmission lines 12a and 12b led out from the receiver device 10, to the transmission line 12b side, to which a load current Iz flowing according to the load, and a transmission current Ia transmitted as an upstream signal from a slave device flow, there is connected the current detection resistor R0. As a result, the current detection resistor R0 generates a current detection voltage Vi proportional to the line current flowing from the transmission line 12b.

The current detection voltage Vi generated by the current detection resistor R0 is input to the negative input terminal of the comparator 48. To the positive input terminal of the comparator 48 there is input a reference voltage Vr set in the digital variable resistor 54.

The comparator 48 outputs a transmission current detection signal which is at an H (high) level when the current detection voltage Vi is less than the reference voltage Vr, and which is inverted to a L (low) level when the current detection voltage Vi exceeds the reference voltage Vr. The output from the comparator 48 is pulled-up to the internal power supply voltage Vd via the resistor R5.

The constant current circuit 50 is such that one end thereof is connected to the transmission line 12a through which the power supply voltage Vc flows, and the other end thereof is connected, via the switch 52, to the current detection resistor R0. This constant current circuit 50 is such that when the switch 52 is turned ON, a predetermined reference current Ie flows to the current detection resistor R0 via the switch 52. As a result, in the current detection resistor R0, there is produced a threshold voltage Ve for detecting a transmission current detection voltage.

In the CPU 22, as a function realized by executing a program, there is provided an adjustment processing section 55.

The adjustment processing section 55 turns the switch 52 ON at an empty timing where the transmission current Ia is not flowing to the transmission lines 12a and 12b, that is, at a predetermined adjustment timing where only the load current Iz due to the load is flowing, and thereby, the reference current Ie flows from the constant current circuit 50 to the current detection resistor R0.

The load current Iz is simultaneously flowing from the transmission line 12b to the current detection resistor R0 at this time. Therefore, if the switch 52 is turned ON, in the current detection resistor R0 there is produced a target adjustment voltage Vt in which a threshold voltage Ve according to the reference current Ie is added to the load current detection voltage Vz, that is, Vt=Vz+Ve.

In this state, the adjustment processing section 55 adjusts a control value C (digital value) in the digital variable resistor 54, so that the reference voltage Vr matches with the target adjustment voltage Vt input from the current detection resistor R0 to the negative input terminal of the comparator 48.

Figure 3:
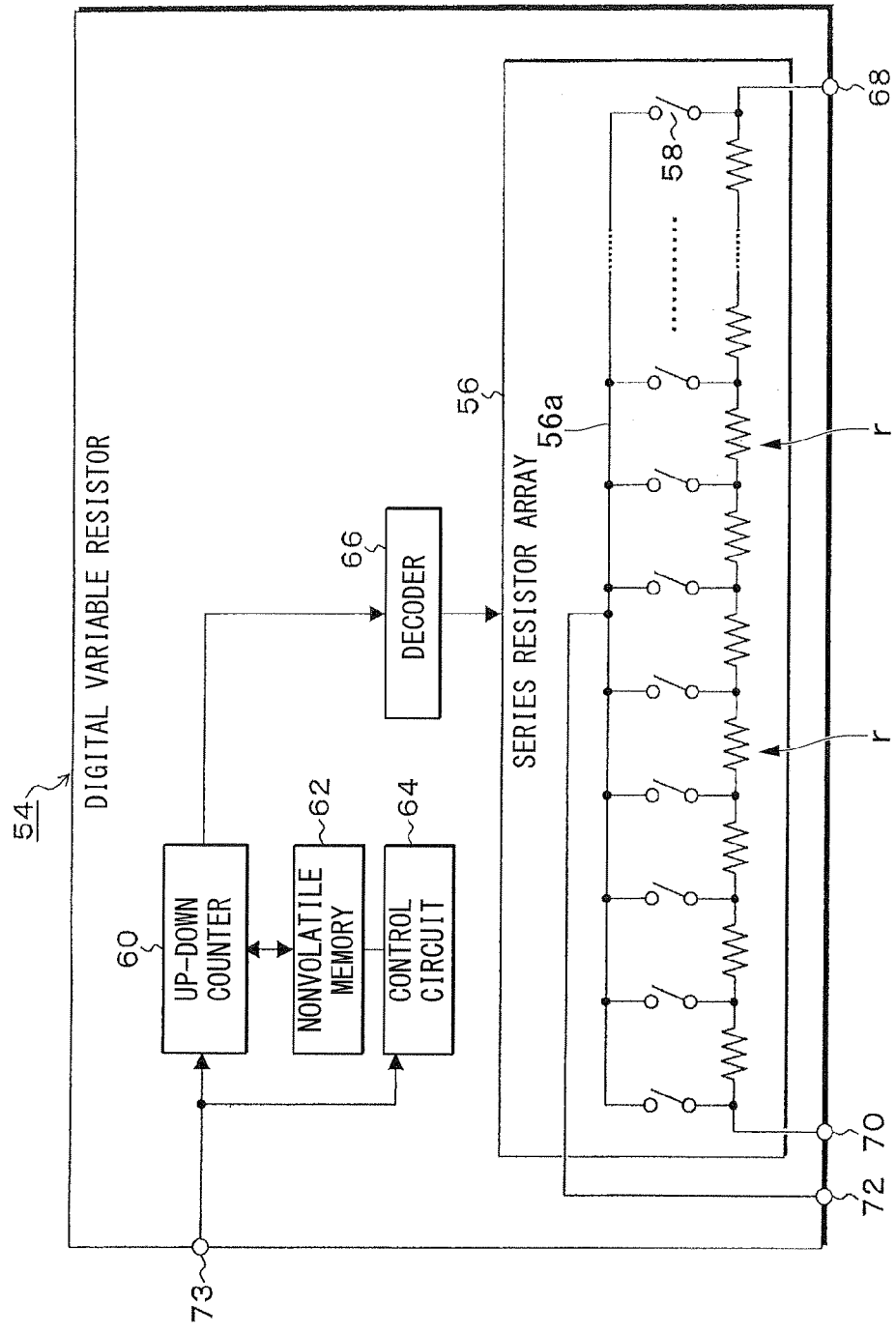
FIG. 3 is a circuit block diagram showing a circuit configuration of a digital variable resistor provided in the receiver device of the same embodiment.

FIG. 3 is a block diagram showing a circuit configuration of the digital variable resistor 54 of the present embodiment. As shown in FIG. 3, the digital variable resistor 54 is provided with; a series resistor array 56, an up-down counter 60, a nonvolatile memory 62, a control circuit 64, and a decoder 66.

The series resistor array 56 is such that a predetermined number of fixed resistors r having a predetermined resistance value are serially connected, and to both ends thereof and to the connection location between the respective resistors r, there is respectively connected one end of a switch 58 using a MOS-FET or the like. The other end of each switch 58 is connected to a common wiring 56a.

From one of the series resistor circuits of the series resistor array 56, there is led out a power supply terminal 68, and from the other end thereof, there is led out a ground terminal 70. Furthermore, the common wiring 56a side connected via the switch 58 is connected to a wiper terminal 72.

By turning the switch 58 ON/OFF with the output of the decoder 66, the series resistor array 56 can switch the resistance value thereof in, for example, 256 stages, and thereby, the current voltage applied between the power supply terminal 68 and the ground terminal 70 can be adjusted to a voltage on an arbitrary stage among the 256 stages and can be output.

To the decoder 66 there is connected the up-down counter 60. The up-down counter 60 receives count signals, which are control signals input to the control terminal 73, and it thereby performs up-count or down-count between the minimum value and the maximum value. Binary data counted with the up-down counter 60 is converted by the decoder 66 to decimal data in 1 to 256 stages for example. Then, by turning ON the switch 58 at the position corresponding to the decimal data transmitted from the decoder 66, a voltage which corresponds to a value (stage number) set with the decoder 66 can be taken out from the wiper terminal 72.

The control circuit 64 performs timing control of the up-down counter 60 and the decoder 66. Moreover, in this digital variable resistor 54, there is provided the nonvolatile memory 62 which stores the value of the up-down counter 60.

Therefore, even if power supply to the digital variable resistor 54 is cut, the value of the up-down counter 60 at this time is held in the nonvolatile memory 62. Accordingly, as an initial value at the time of subsequently turning ON the power supply, the value of the nonvolatile memory 62 is set in the up-down counter 60. As a result, it is possible, even if power supply is cut, to hold the adjustment value at this time. In those cases where the adjustment value is not required to be held even if power supply is cut, there is no need for providing the nonvolatile memory 62.

Figure 4:
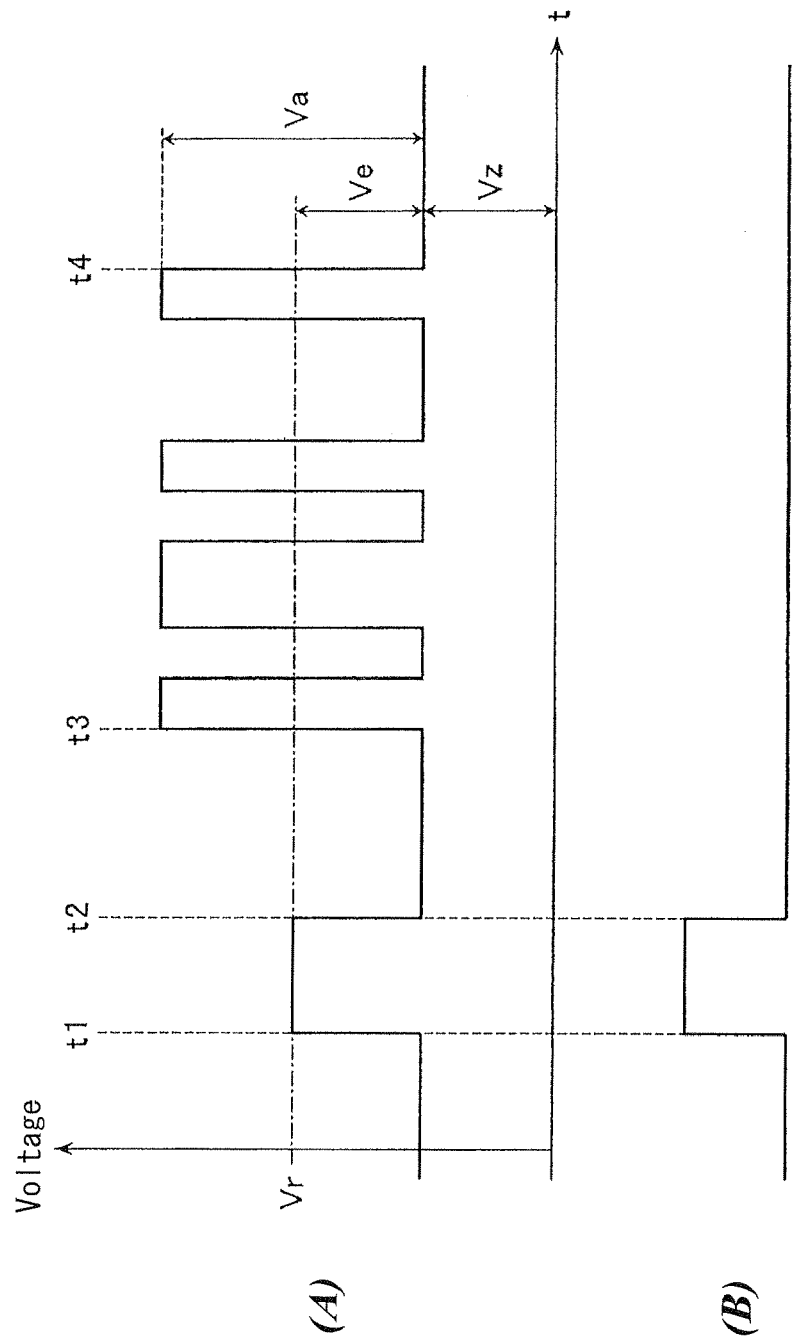
FIG. 4(A) shows the input voltage of the comparator 48.
FIG. 4(B) shows the reference voltage adjustment timing.

FIG. 4 is a time chart showing the comparator input voltage and reference voltage adjustment timing in the present embodiment. FIG. 4 (A) shows the input voltage of the comparator 48. Normally, the comparator 48 is receiving only the load current Iz flowing from the transmission line 12b. Therefore, a load voltage Vz corresponding to the load current Iz is produced in the current detection resistor R0, and it is input as a line current detection voltage Vi to the input terminal of the comparator 48.

The adjustment processing section 55 provided in the CPU 22 of FIG. 2 executes a process of adjusting the reference voltage Vr which is produced from the digital variable resistor 54 during a period of time between time t1 and time t2 which is a timing where only the load current Iz from the transmission line 12b is flowing, that is, an empty timing where transmission of the transmission current Ia from the slave device is not being performed.

This adjustment process is performed such that the switch 52 is turned ON to allow the reference current Ie from the constant current circuit 50 to flow to the current detection resistor R0, and a threshold voltage Ve which corresponds to the reference current Ie is generated in a form added to the load current detection voltage Vz due to the load current Iz flowing as a base current. Then, an adjustment target voltage Vt=Vz+Ve, in which both of these voltages are added, is generated, and this is applied to the negative input terminal of the comparator 48.

In this state, the adjustment processing section 55 adjusts the digital value serving as a control value C for the digital variable resistor 54, and it ends the adjustment process at the point in time where the reference voltage Vr output from the digital variable resistor 54 has matched with the target adjustment voltage Vt applied to the negative input terminal. As a result, the digital variable resistor 54 after completion of the adjustment, is set so that there is applied to the positive input terminal of the comparator 48, the reference voltage Vr which matches with the target adjustment voltage Vt having been applied to the negative input terminal of the comparator 48 at the adjustment timing t1 to t2 (that is, Vt=Vz+Ve).

The threshold voltage Ve generated in the current detection resistor R0 by the reference current Ie from the constant current circuit 50, is determined based on the value of the reference current Ie which generates a voltage ½ of the transmission current detection voltage Va to be generated in the current detection resistor R0, by means of an alarm current Ia from the slave device.

After adjustment of the reference voltage Vr by means of the digital variable resistor 54 has been completed in this way, when the increment with respect to the base load current detection voltage Vz of the transmission current detection voltage Va according to the transmission current Ia from the slave device, which exceeds the reference voltage Vr with respect to the comparator 48 is exceeded (that is to say, when it increases and exceeds the threshold voltage Ve), then for the voltage portion which exceeds the reference voltage Vr, the comparator 48 outputs a transmission current detection signal inverted to an L level, to the CPU 22.

Figure 5:
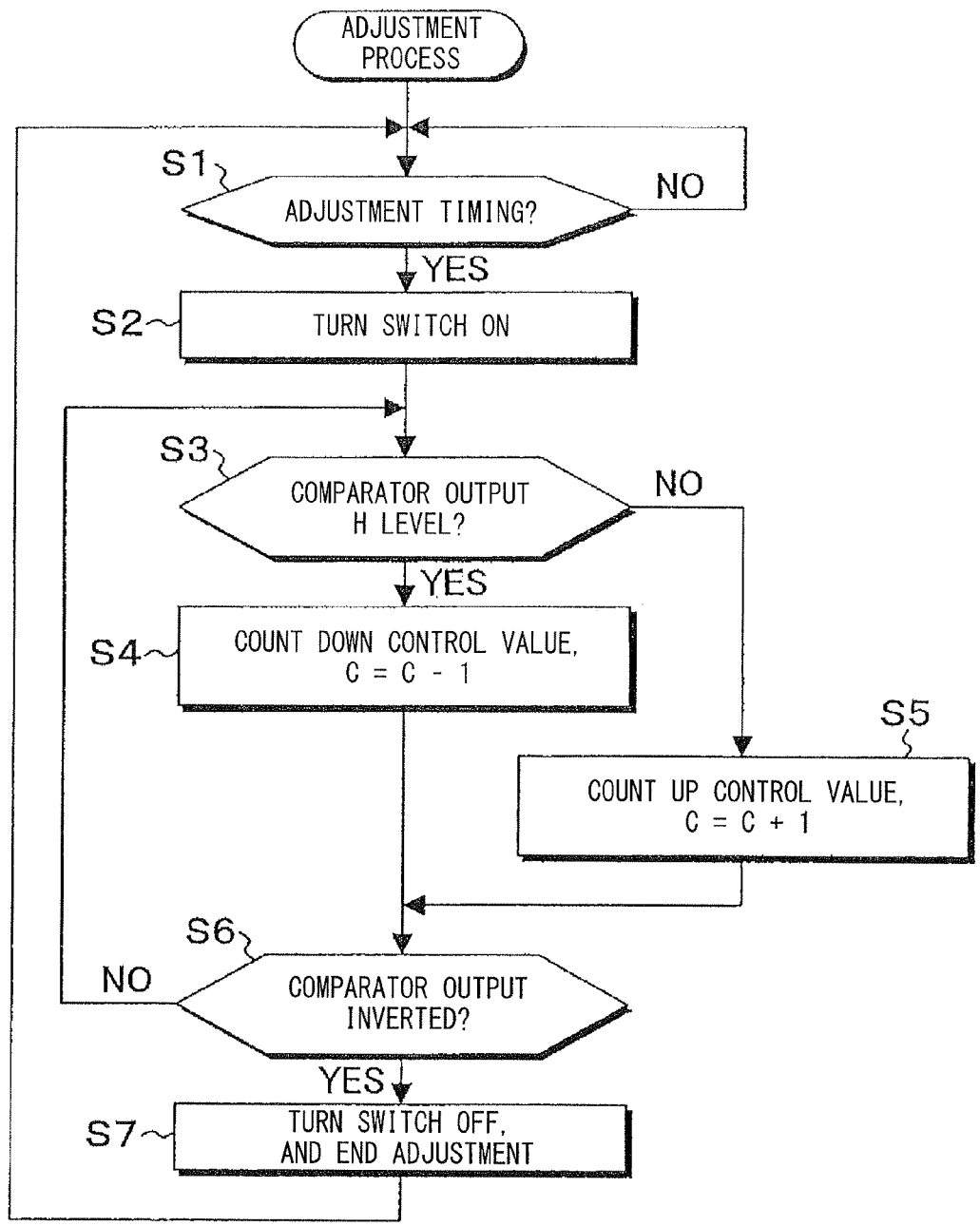
FIG. 5 is a flow chart showing a reference voltage adjustment process in the same embodiment.

FIG. 5 is a flow chart showing a reference voltage adjustment process in the present embodiment.

As shown in this FIG. 5, in the reference voltage adjustment process, first, in step S1, it is determined whether or not it is an adjustment timing, which is an empty timing where transmission of transmission current Ia from the slave device is not being made. If it is determined as being an adjustment timing, the process proceeds to step S2, and the switch 52 is turned ON. Then, a reference current Ie flows from the constant current circuit 50 to the current detection resistor R0, and a target adjustment voltage Vt, which is Vt=Vz+Ve, is input to the negative input terminal of the comparator 48.

The process proceeds to step S3 in this state, and it is checked whether or not the output of the comparator 48 is an H level. If the output of the comparator 48 is an H level as a result of this checking, it means that the output voltage from the digital variable resistor 54 is higher than the target adjustment voltage Vt. In this case, the process proceeds to step S4, and the control value C with respect to the digital variable resistor 54 is counted down by 1 bit. Accordingly, the value of the up-down counter 60 shown in FIG. 3 is set to −1. Thereby, the output voltage of the digital variable resistor 54 being a high value approaches to the target adjustment voltage V1.

Next, in step S6, it is determined whether or not the output of the comparator 48 is inverted from an H level to an L level, and the count-down performed in steps S3 and S4 is repeated until it has been inverted to an L level. If the output voltage of the digital variable resistor 54 passes the target adjustment voltage Vi with a change of 1 bit, it is inverted from the H level output before the 1 bit change to the L level output after the 1 bit change. Therefore, the completion of adjustment is determined at this point in time, and the process proceeds to step S7 where switch 52 is turned OFF and the adjustment process is completed.

Meanwhile, if the result of checking the output of the comparator 48 first in step S3 is an L level output, it means that the output voltage of the digital variable resistor 54 is lower than the target adjustment voltage Vt. In this case, the process proceeds to step S5, Then, with the control value C, count-up of the up-down counter provided in the digital variable resistor 54 is performed by a 1-bit unit. When the output of the comparator 48 is inverted from an L level to an H level while count-up is being performed in step S6, it is determined that the output voltage of the digital variable resistor 54 has matched with the target adjustment voltage Vt, and in step S7, the switch 52 is turned OFF and the adjustment process is completed.

In the adjustment process shown in FIG. 5, in the case where the output of the comparator 48 is inverted while performing a 1-bit unit adjustment by counting up or counting down with respect to the digital variable resistor 54, the output voltage of the digital variable resistor 54 due to the control value after the inversion, is taken as the reference voltage Vr. However, after the inversion, the output voltage of the digital variable resistor 54 due to the control value 1 bit before the inversion, may be taken as the reference voltage Vr.

Figure 6:
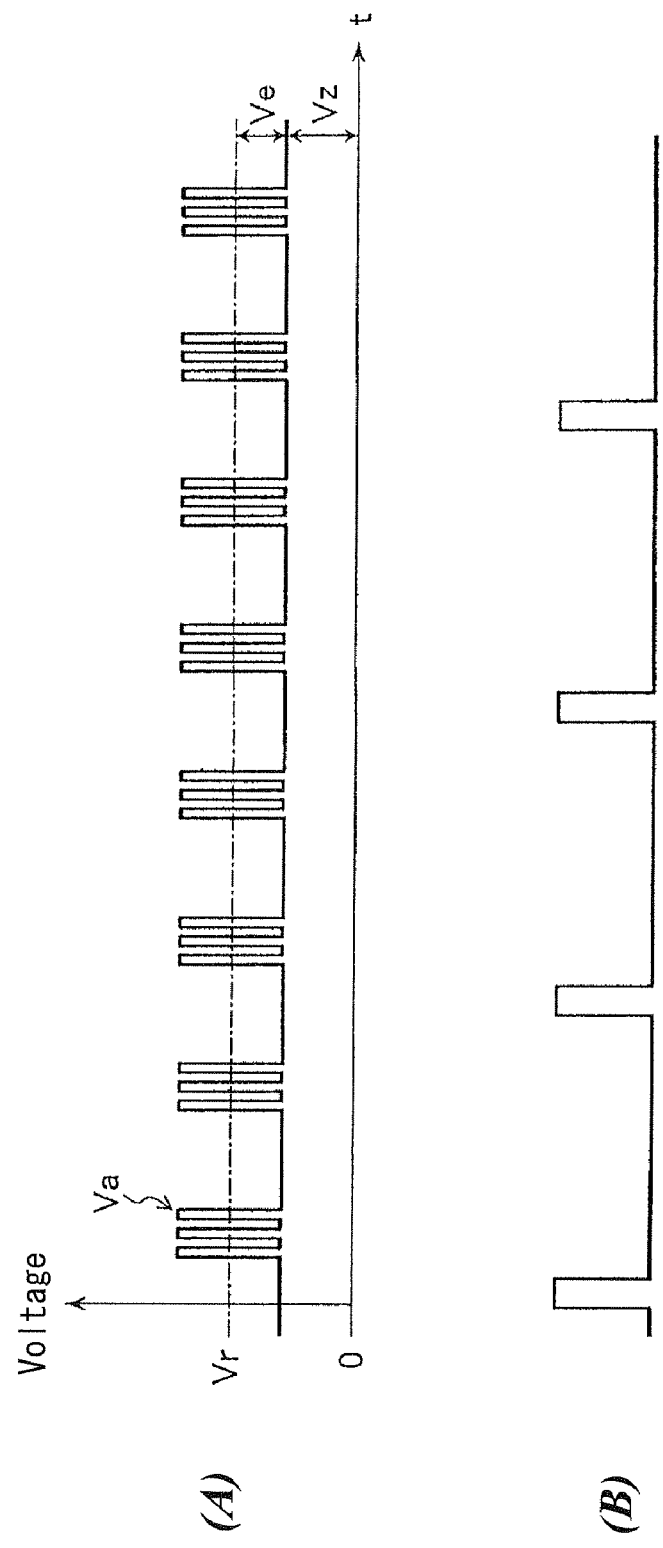
FIG. 6(A) shows the line current detection voltage to be input to the comparator 48.
FIG. 6(B) shows the reference voltage adjustment timing in a case where load current is stable.

FIG. 6 is a time chart showing line current detection voltage and reference voltage adjustment timing in a case where the load current is stable. FIG. 6 (A) shows the line current detection voltage to be input to the comparator 48, and since the load current Iz is constant, there is produced a constant load current detection voltage Vz so as to correspond thereto. Further, a transmission current detection voltage Va in a pulse form due to the transmission current Ia from the slave device, is produced in a state of being added to this constant load current detection voltage Vz.

Moreover, the reference voltage Vr is set, in the adjustment process of the digital variable resistor 54, to a voltage in which a threshold voltage Ve, which is ½ of the transmission current detection voltage Va, is added to the base load current detection voltage Vz. Then, the portion of the transmission current detection voltage Va which exceeds the reference voltage Vr is detected and output as a transmission current detection signal by the comparator 48.

The transmission current transmitted from the slave device is output in a constant cycle as a normal response to polling from the receiver device 10 shown in FIG. 1 which sequentially specifies the address of slave devices. Therefore, as for the reference voltage adjustment timing shown in FIG. 6 (B), since the digital variable resistor 54 is used, the reference voltage Vr is not reduced over time as observed in those cases where sample-holding is performed with a conventional capacitor. Therefore, it is possible to set a reference voltage adjustment timing at, for example, every other empty timing as shown in FIG. 6 (B) rather than all of the empty timings of the transmission currents output periodically for example.

Figure 7:
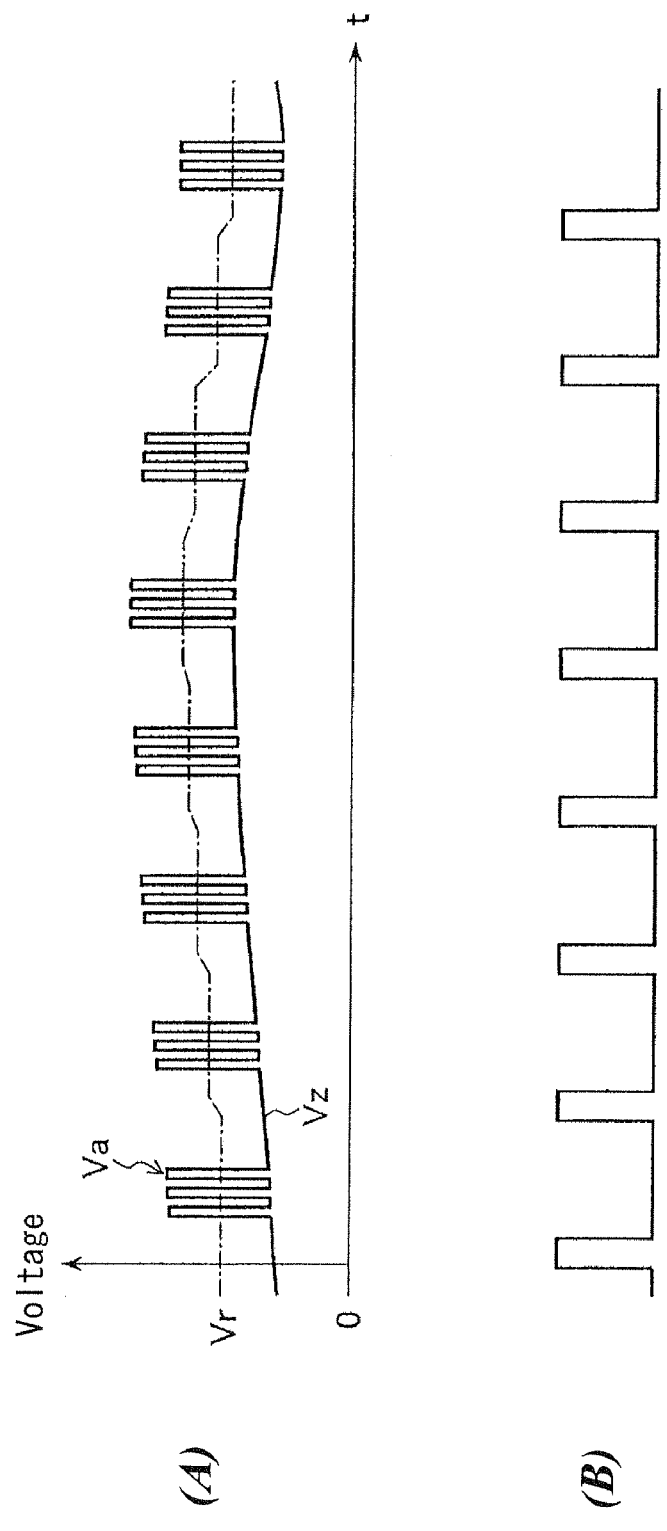
FIG. 7(A) shows variation in the load current detection VZ.
FIG. 7(B) shows the reference adjustment timing in case where load current varies.

FIG. 7 is a time chart showing line current detection voltage and reference voltage adjustment timing in a case where the load current varies. In a state where the analog type sensor 14 and the relay device 16 connected to the transmission lines 12a and 12b are not operating, a constant consumption current flows and the total thereof flows as a load current. However, this load current is not always constant, and it gradually changes depending on temperature and aged deterioration.

FIG. 7(A) shows variations in the load current detection voltage Vz according to this type of gradual variation in the load current Iz. In this case, as shown in FIG. 7(B), by setting the reference voltage adjustment timing at all of the empty timings of the transmission current, it is possible to set the reference voltage Vr so as to track the changes in the load current Iz.

Also in this case, since the digital variable resistor 54 is used, during the period of time between the moment of adjusting the reference voltage and the next moment of adjusting the reference voltage, no temporal change occurs in the reference voltage as observed in the conventional configuration in which sample-holding is performed with a capacitor. Therefore, it is possible to detect transmission current more accurately.

[Second Embodiment]

Figure 8:
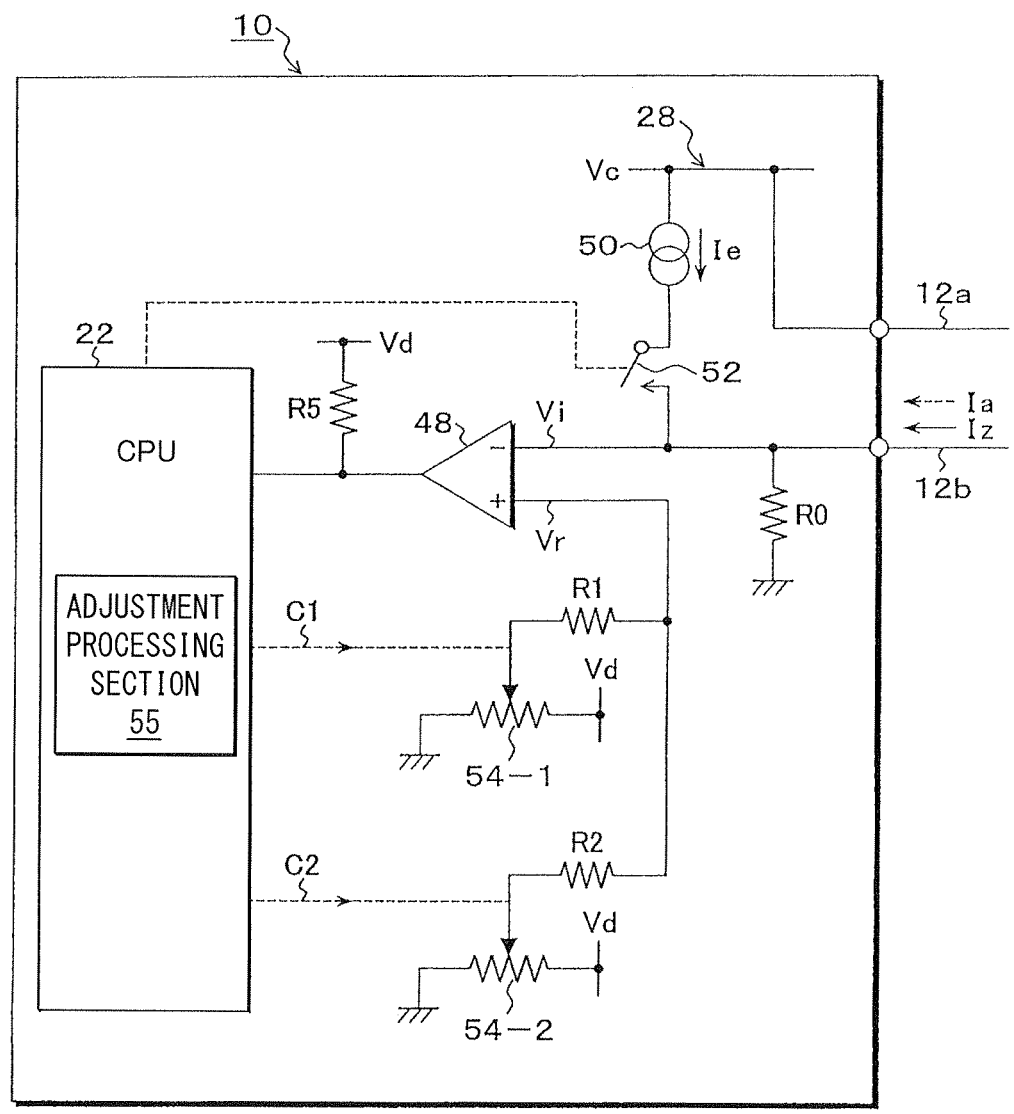
FIG. 8 is a circuit diagram of a receiver device provided with a transmission input circuit according to a second embodiment of the present invention.

FIG. 8 is a circuit diagram showing a second embodiment of a transmission input circuit of the present invention. In the present embodiment, in order to reduce the amount of time required for reference voltage adjustment, there are provided a digital variable resistor for coarse adjustment and a digital variable resistor for fine adjustment.

As shown in FIG. 8, in a transmission input circuit 28 provided in a receiver device 10, as with the case of the first embodiment, there are provided a current detection resistor R0, a comparator 48, a constant current circuit 50, a switch 52, and a pull-up resistor R5. In addition to these, in the transmission input circuit 28 of the present embodiment, there are provided a first digital variable resistor 54-1 for coarse adjustment and a second digital variable resistor 54-2 for fine adjustment.

The first digital variable resistor 54-1 is connected, via a first resistor R1 having a sufficiently high resistance value, to the positive input terminal of the comparator 48. Moreover, the second digital variable resistor 54-2 is similarly connected, via a second resistor R2 having a sufficiently high resistance value, to the positive input terminal of the comparator 48.

Here, the first resistor R1 and the second resistor R2 determine the adjustment ratio of the reference voltage Vr due to the two digital variable resistors 54-1 and 54-2, and the resistance value of the first resistor R1 on the coarse adjustment side is made lower than the resistance value of the second resistor R2 on the fine adjustment side. For example, where the first resistor R1 on the coarse adjustment side is 10 kΩ, the second resistor R2 on the fine adjustment side is 100 kΩ. Accordingly, in the case where the adjustment ratio on the coarse adjustment side of the first digital variable resistor 54-1 is 1, with the same operating amount, the adjustment voltage of the second digital variable resistor 54-2 can be set to 1/10.

Figure 9:
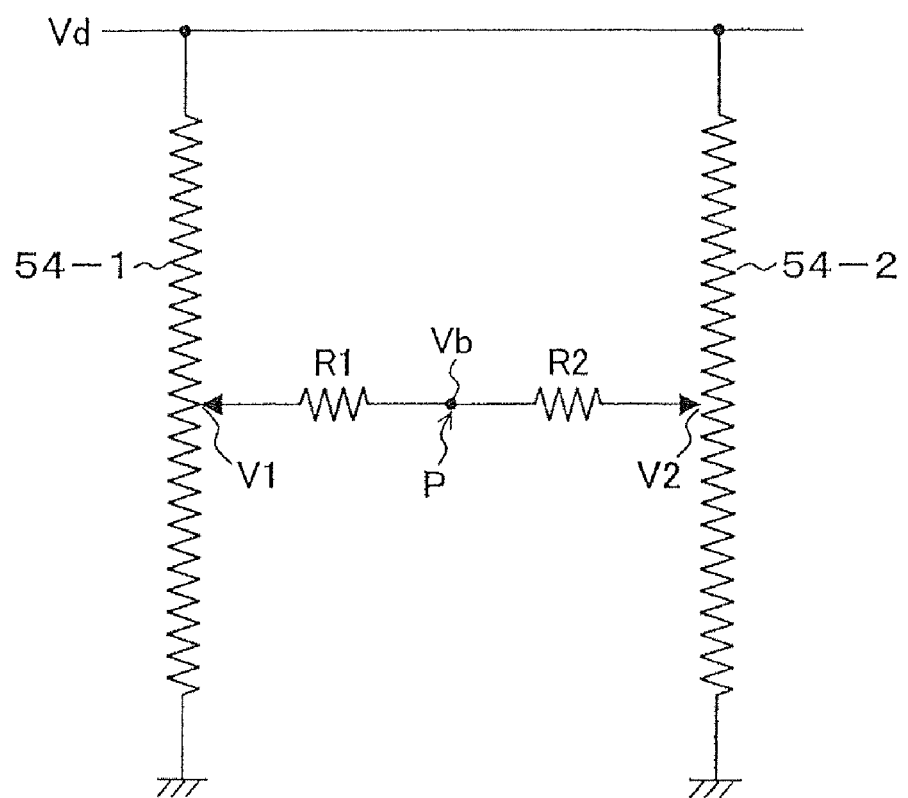
FIG. 9 is a diagram of an equivalent circuit for changing the comparator input voltage Vb with a coarse adjustment and fine adjustment performed by two digital variable resistors in the same embodiment.

FIG. 9 shows an equivalent circuit diagram in which the reference voltage with respect to the comparator 48 is changed with a coarse adjustment and fine adjustment performed by the two digital variable resistors 54-1 and 54-2 of the present embodiment. In FIG. 9, the first and second digital variable resistors 54-1 and 54-2 are connected between the same internal power supply voltage Vd and the ground side, and the wiper terminals thereof are respectively connected, via the first resistor R1 and the second resistor R2, to a connection point P which leads to the positive input terminal of the comparator 48.

Here, in the case where the wiper terminal voltage of the first digital variable resistor 54-1 is V1 and the wiper terminal voltage of the second digital variable resistor 54-2 is V2, the reference voltage Vr with respect to the comparator 48 is expressed by the following formula (1).

$$Vr = V1 - (V1 - V2)R1/(R1 + R2) \tag{1}$$

That is to say, the reference voltage Vr is a value obtained such that the differential voltage (V1−V2) between the wiper terminal voltages V1 and V2 in the first and second digital variable resistors 54-1 and 54-2 is voltage-divided by the first resistor R1 and the second resistor R2, and it is subtracted, for example, from the wiper terminal voltage V1.

Referring to FIG. 8 again, in the present embodiment, since there are provided the first digital variable resistor 54-1 for coarse adjustment and the second digital variable resistor 54-2 for fine adjustment, the resolution of the reference voltage adjustment can be made finer, and the adjustment time can be reduced at the same time.

For example, it is assumed that the first and second digital variable resistors 54-1 and 54-2 have the following performance properties.

Maximum adjustment voltage: 10 volt
Minimum resolution: 1 millivolt at 10 microsecond/time In the case where the digital variable resistors have this type of adjustment performance properties, when an adjustment is to be made with only one unit of the first digital variable resistor 54-1 for example, a digital variable resistor having 10,000 adjustment steps is required, and the maximum adjustment time takes 100 milliseconds.

On the other hand, in the case where the first and second digital variable resistors 54-1 and 54-2 are used as with the case of the present embodiment, they are respectively used as 100 step digital variable resistors to perform two separate adjustments, and thereby a 10,000 step adjustment becomes possible. In this case, since they are respectively capable of performing a 100 step adjustment, the length of time required for the adjustment is only short, 2 milliseconds, that is, twice 1 millisecond.

Figure 10:
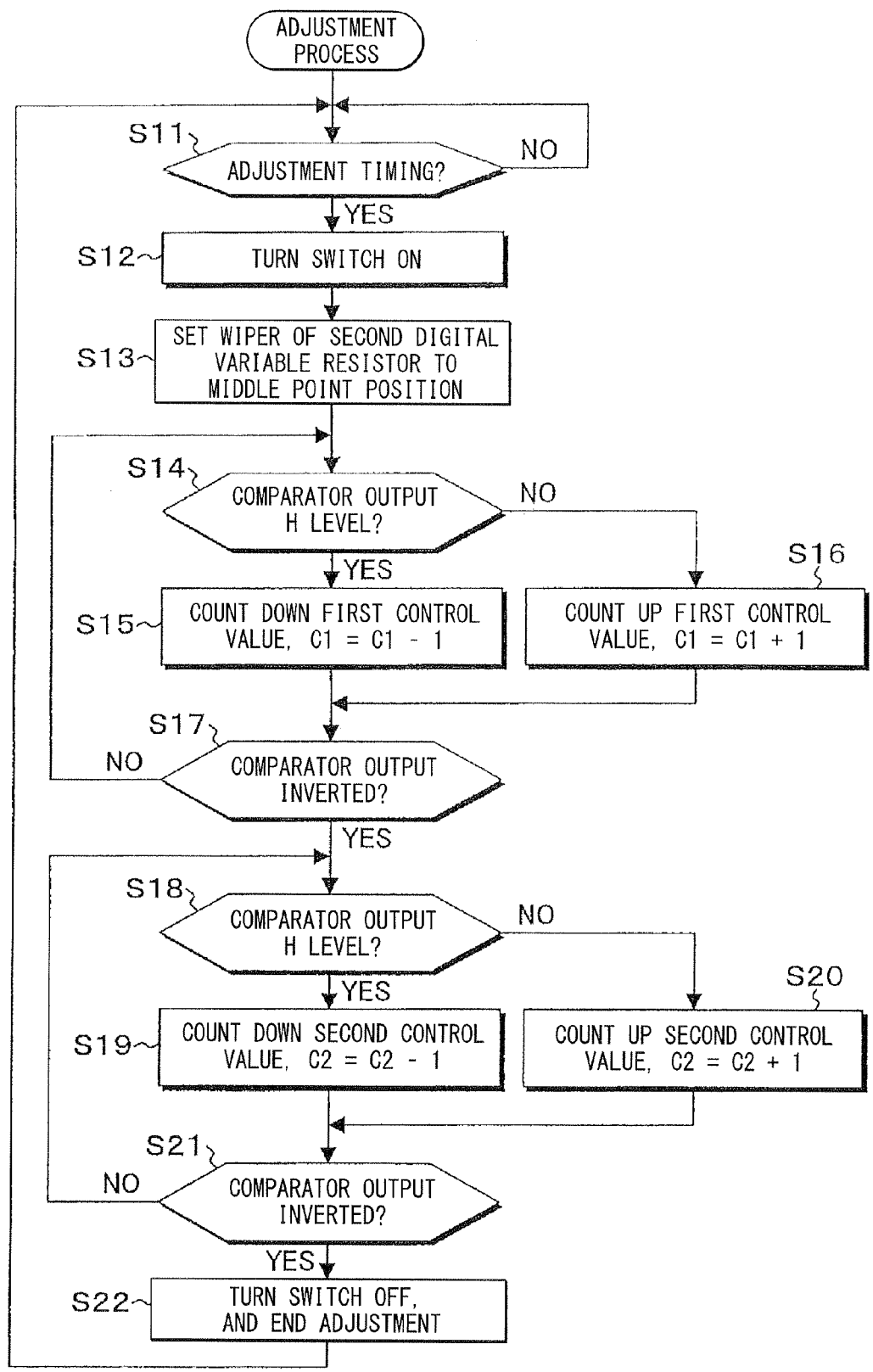
FIG. 10 is a flow chart showing a reference voltage adjustment process in the same embodiment.

FIG. 10 is a flow chart showing a reference voltage adjustment process in the present embodiment. As shown in FIG. 10, first, in step S11, it is determined whether or not it is an adjustment timing where transmission current from the slave device is absent, and if it is determined as an adjustment timing, the process proceeds to step S12. In step S12, the switch 52 is turned ON, and a reference current Ie is flowed from the constant current circuit 50 to the current detection resistor R0. At this time there is generated a target adjustment voltage Vt in which a threshold voltage Ve due to the reference current Ie is added to the load current detection voltage Vz due to the load current Iz input from the transmission line 12b (that is, Vt=Vz+Ve), and this is applied to the negative input terminal of the comparator 48.

Subsequently, in step S13, the wiper terminal of the second digital variable resistor 54-2 is set to a middle point position. This is done in order to prevent a situation where an adjustment cannot be performed by the first digital variable resistor 54-1 in the unlikely case where the wiper position of the second digital variable resistor 54-2 is at a position of the minimum voltage 0 volt or at a voltage position of the maximum voltage Vd.

Next, in steps S14 to S17, a fine adjustment of the reference voltage Vr is performed by the first digital variable resistor 54-1. That is to say, in step S14 it is determined whether or not the output of the comparator 48 is an H level. If the output is determined as being an H level as a result of the determination, the reference voltage Vr is higher than the target adjustment voltage Vt. Accordingly, the first control value C1 is counted down as −1 in step S15, and the process in steps S14 and S15 is repeated until the output of the comparator 48 has been inverted to an L level in step S17.

On the other hand, if the output of the comparator 48 is determined as being an L level as a result of the determination of step S14, the reference voltage Vr is lower than the target adjustment voltage Vt. Accordingly, the process proceeds to step S16, and the first control value C1 for the first digital variable resistor 54-1 is counted up as +1. Subsequently, the process in steps S14 and S16 is repeated until the output of the comparator 48 has been inverted to an H level in step S17.

When inversion of the output of the comparator 48 is determined in step S17, the coarse adjustment of the first digital variable resistor 54-1 is determined as being completed, and a fine adjustment of the second digital variable resistor 54-2 in the subsequent steps S18 to S21 is performed.

Also in this fine adjustment, if the output of the comparator 48 is an H level in step S18, the second control value C2 is counted down as −1 in step S19. Moreover, if the output of the comparator 48 is an L level, then in step S20 there is performed a process of counting up the second control value C2 as +1. Through the repeated count-up or count-down of the second control value C2, the reference voltage Vr is determined as having matched with the target adjustment voltage Vt when inversion of the output of the comparator 48 is determined in step S21, and in step S22, the switch is turned OFF to complete the fine adjustment.

[Third Embodiment]

Figure 11:
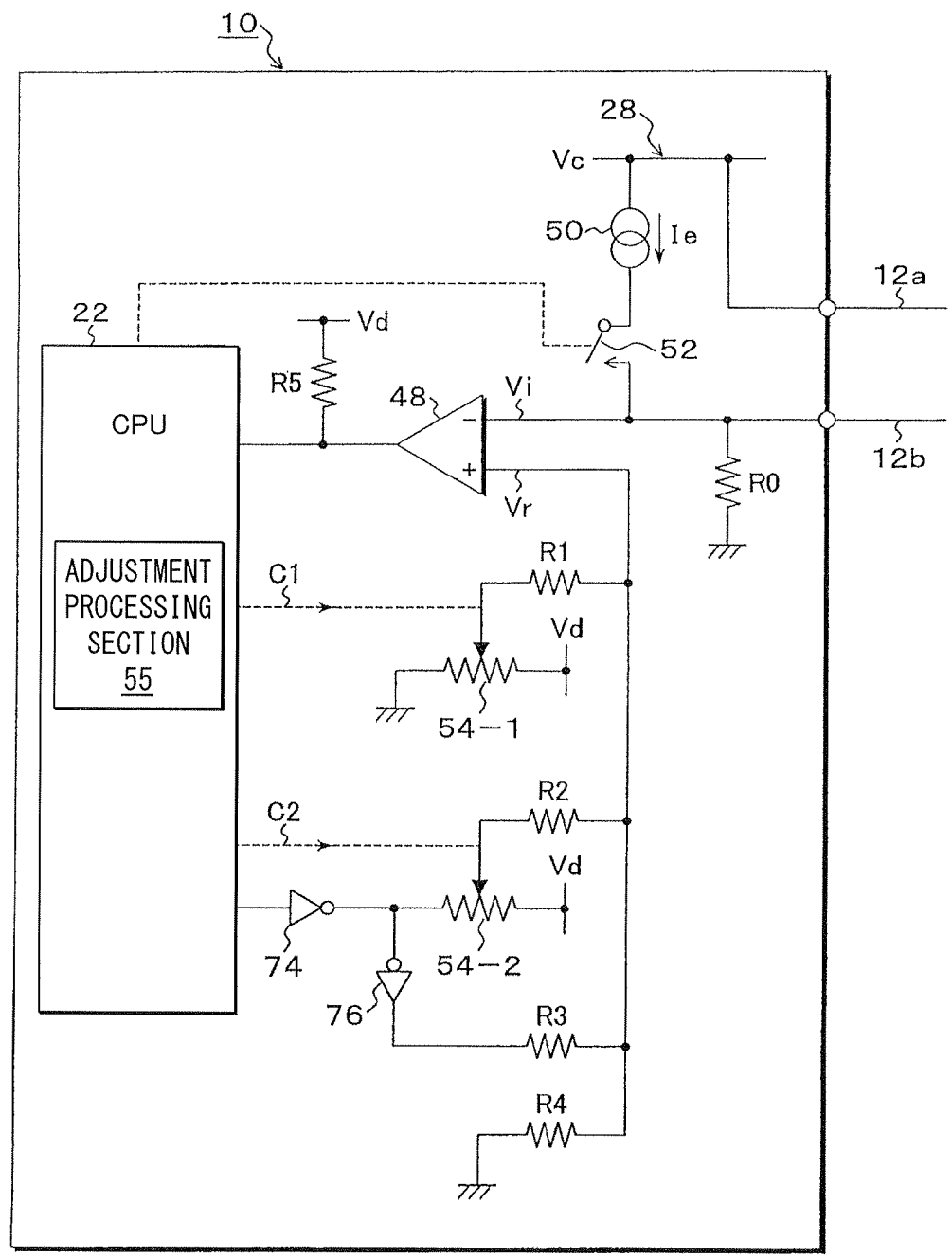
FIG. 11 is a circuit diagram showing a third embodiment of a transmission input circuit according to the present invention.

FIG. 11 is a circuit diagram showing a third embodiment of a transmission input circuit of the present invention. When performing the coarse adjustment of the first digital variable resistor 54-1 in the second embodiment, the software process performed by the adjustment processing section 55 of the CPU 22 for fixing the second digital variable resistor 54-2 for fine adjustment at a middle point position is cumbersome. Consequently, in the present embodiment, a process of holding the second digital variable resistor 54-2 at a middle point position is performed at a hardware level using a logic circuit and a resistor circuit.

As shown in FIG. 11, as with the second embodiment, a transmission input circuit 28 provided in a receiver device 10 is provided with; a current detection resistor R0, a comparator 48, a constant current circuit 50, a switch 52, a pull-up resistor R5, a first digital variable resistor 54-1 for coarse adjustment, and a second digital variable resistor 54-2 for fine adjustment.

In addition to these, on the second digital variable resistor 54-2 side, there are added logic circuit with inverters 74 and 76, and a resistor circuit including a third resistor R3 and a fourth resistor R4. Then, by outputting a control signal from an adjustment processing section 55 provided in a CPU 22 to the inverter 74, it is possible, at a hardware level, to fix the output from the second digital variable resistor 54-2 side to an output voltage in which the position of the wiper terminal is at a middle point position.

That is to say, the first inverter 74 receives input of the control signal sent from the adjustment processing section 55 of the CPU 22, and the output thereof is connected to a ground terminal of the second digital variable resistor 54-2. Moreover, the second inverter 76 inputs the output of the inverter 74, and the output thereof is connected, via the third resistor R3, to the positive input terminal of the comparator 48. Furthermore, the fourth resistor R4 is connected in parallel with the third resistor R3.

Here, between a second resistor R2 provided on the output line of the wiper terminal of the second digital variable resistor 54-2 and the newly provided third and fourth resistors R3 and R4, there is a relationship expressed by the following formula (2).

$$R3=2\times R2\, R4=2\times R2 \tag{2}$$

When adjusting the reference voltage Vr for the comparator 48, a coarse adjustment is first performed by the first digital variable resistor 54-1. However, at this time, the adjustment processing section 55 outputs an L level signal to the first inverter 74. Upon receiving an input of the L level signal, the first inverter 74 inverts it to an H level and outputs it. In response to this, the second inverter 76 inverts the H level input and generates an L level output.

Here, as the voltage of the H level output of the first inverter 74 and the second inverter 76, an internal power supply voltage Vd is output. Therefore, the resistor circuit network at this time with respect to the positive input terminal of the comparator 48 is as shown in FIG. 12A.

Figure 12A:
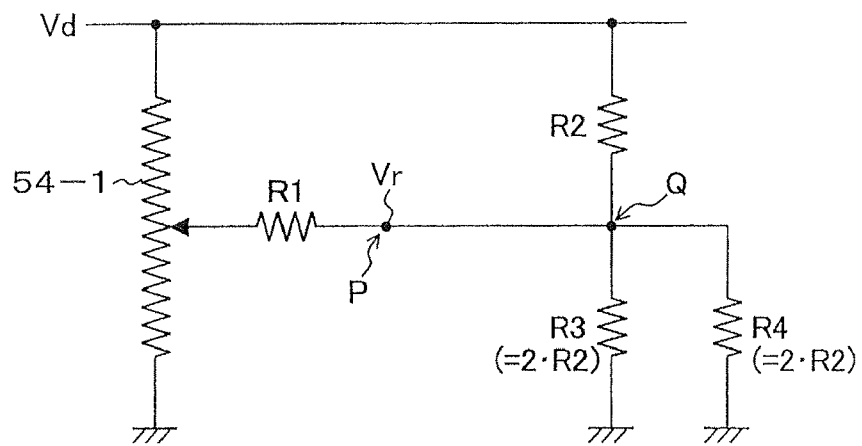
FIG. 12A is an equivalent circuit diagram showing a resistor circuit in which, with two inverters in the third embodiment, an output voltage corresponding to a middle point of the wiper position is generated while the second digital variable resistor for fine adjustment is separated.

In FIG. 12A, on the first digital variable resistor 54-1 side, which is the adjustment target, the wiper terminal is connected, via the first resistor R1, to the P point which is connected to the comparator 48. On the other hand, as for the second digital variable resistor 54-2 side, the internal power supply voltage Vd is applied to the ground terminal side with the H level output of the first inverter 74. Therefore, the same internal power supply voltage Vd is also applied to the wiper terminal. Furthermore, the other end of the third resistor R3 is equivalent to being connected to the ground side with a low level output of the second inverter 76, and accordingly, as shown in FIG. 12A, with respect to the internal power supply voltage Vd, there is realized an equivalent circuit in which a parallel circuit including the third resistor R3 and the fourth resistor R4 is serially connected to the second resistor R2.

Here, since R3=R4=2×R2, the resistance value of the parallel circuit including the resistor R3 and the resistor R4 is the same as that of the resistor R2, and therefore, the voltage at the series connection point Q is Vd/2, which is half of the internal power supply voltage Vd.

That is to say, it is possible to create a state the same as the adjusted state where Vd/2 is output while the position of the wiper terminal of the second digital variable resistor 54-2 is at a middle point position. Accordingly, the first digital variable resistor 54-1 is able to perform a coarse adjustment for matching the reference voltage Vr with the target adjustment voltage Vt, without being dependent on the position of the wiper terminal of the second digital variable resistor 54-2.

When the coarse adjustment performed by the first digital variable resistor 54-1 is completed, the adjustment processing section 55 shown in FIG. 11 inverts the output with respect to the first inverter 74, from the current L level output to an H level output. Consequently, the output of the first inverter 74 is inverted from an H level to an L level, and the ground terminal of the second digital variable resistor 54-2 becomes an L level and is connected to the ground side, to return to a normal internal power supply voltage application state.

Moreover, the L level output of the first inverter 74 is inverted by the second inverter 76 to be an H level output, and the internal power supply voltage Vd is applied to the other end side of the third resistor R3 as a result.

Figure 12B:
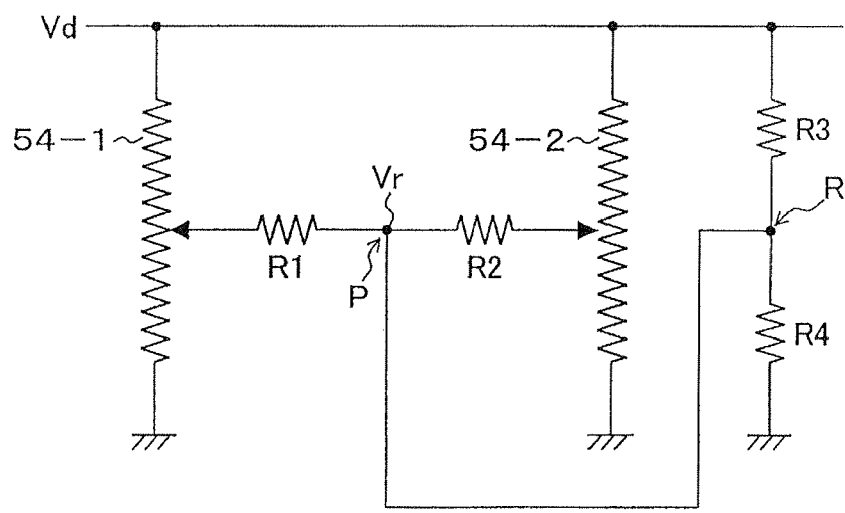
FIG. 12B is an equivalent circuit diagram showing a resistor circuit in which, with the two inverters in the third embodiment, an output voltage corresponding to a middle point of the wiper position is generated while the second digital variable resistor for fine adjustment is separated.

This state is shown with the equivalent circuit illustrated in FIG. 12B. That is to say, the first digital variable resistor 54-1 is at a position where the position of the wiper terminal thereof has been coarse-adjusted. In this state, the second digital variable resistor 54-2 is such that the wiper terminal is connected via the second resistor R2 to the connection point P with respect to the comparator 48, and further, the series connection point R of a series circuit including the third resistor R3 and the fourth resistor R4 is connected to the connection point P with respect to the comparator 48.

Since R3=R4, the voltage of this series connection point R is Vd/2, and it takes a voltage the same as that in the case where the position of the wiper terminal of the second digital variable resistor 54-2 is at a middle point position. Therefore, fine adjustment can be performed by the second digital variable resistor 54-2, without being influenced by the connection with the third resistor R3 and the fourth resistor R4.

Figure 13:
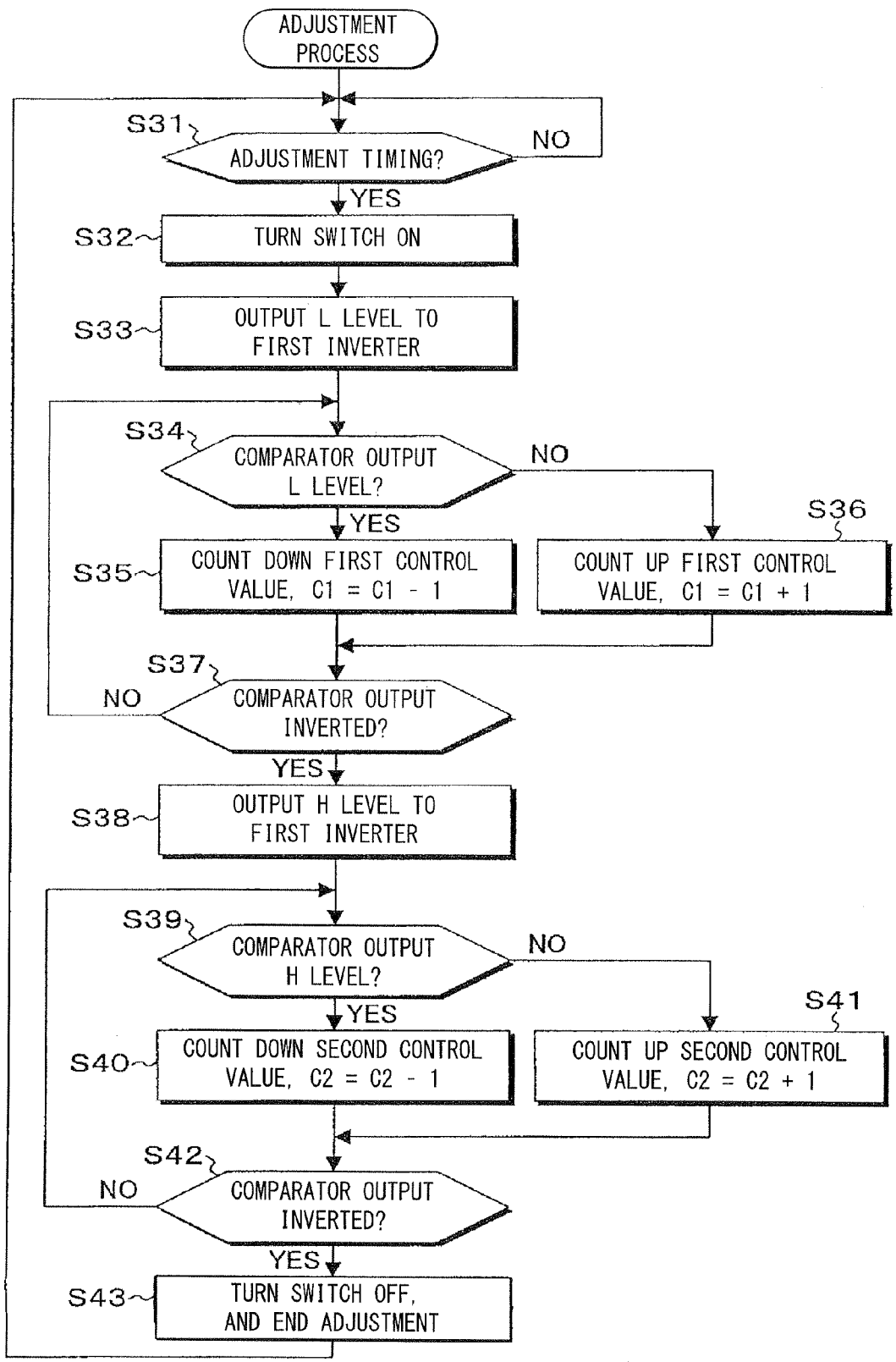
FIG. 13 is a flow chart showing a reference voltage adjustment process in the third embodiment.

FIG. 13 is a flow chart showing a reference voltage adjustment process in the present embodiment. The adjustment process shown in FIG. 13 is basically the same as that shown with the flow chart of the second embodiment. However, there are newly provided points namely: (a) in step S31, prior to coarse adjustment performed by the first digital variable resistor 54-1, a low level output is performed with respect to the first inverter 74, to create a circuit state equivalent to that in the case where the wiper terminal position of the second digital variable resistor 54-2 shown in FIG. 12A is at a middle point position; and (b) in step S38, when coarse adjustment has progressed, prior to fine adjustment performed by the second digital variable resistor 54-2, a high level output is performed with respect to the first inverter 74 to perform a process of creating an equivalent circuit state where coarse adjustment performed by the second digital variable resistor 54-2 shown in FIG. 12B is possible.

That is to say, steps S31 and S32 of FIG. 13 correspond to steps S11 and S12 of FIG. 10, steps S34 to S37 correspond to steps S14 to S17 of FIG. 10, and further, steps S40 to S44 correspond to steps S18 to S22 of FIG. 10.

[Fourth Embodiment]

Figure 14:
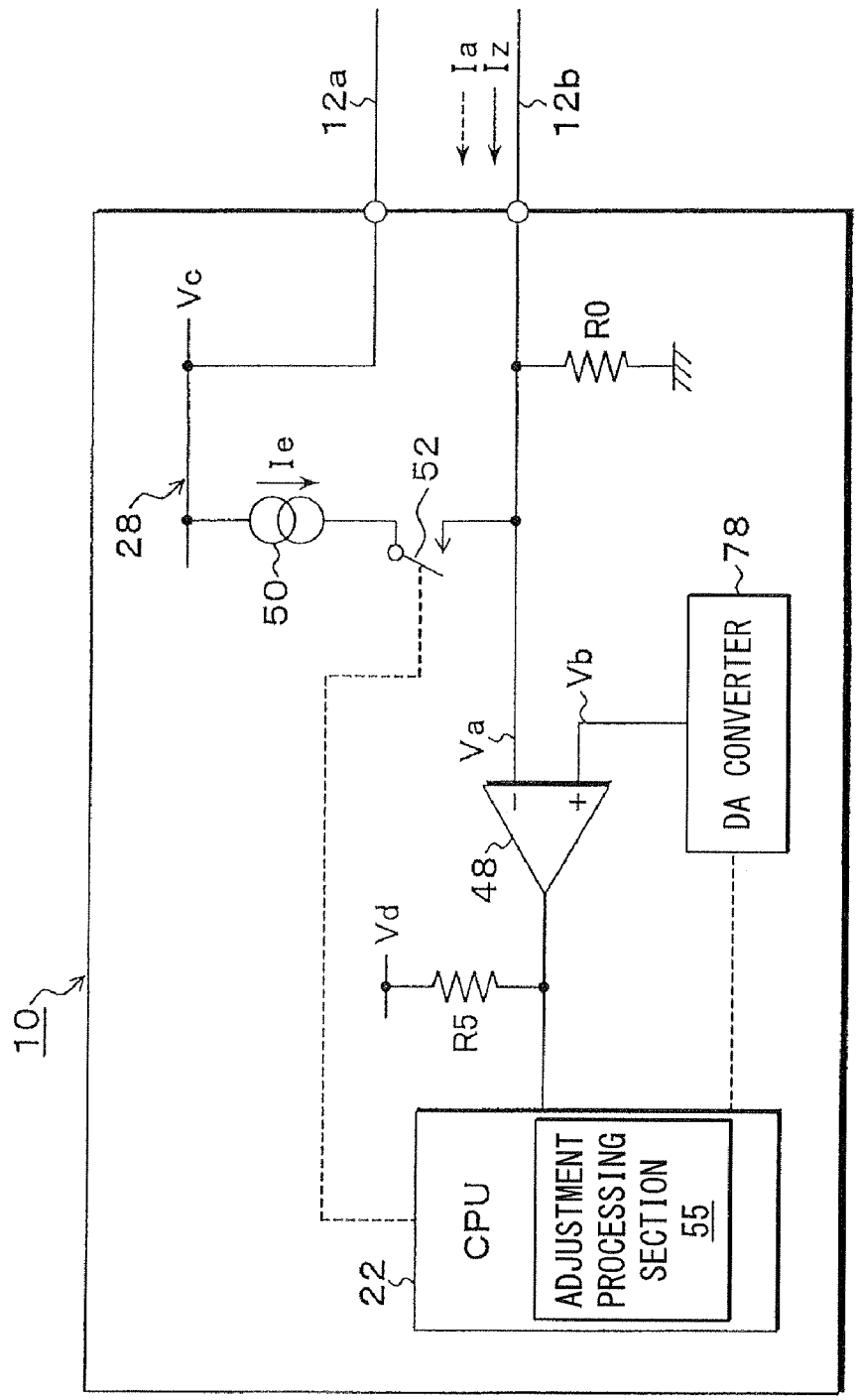
FIG. 14 is a circuit diagram of a receiver device provided with a transmission input circuit according to a fourth embodiment of the present invention.
Figure 15:
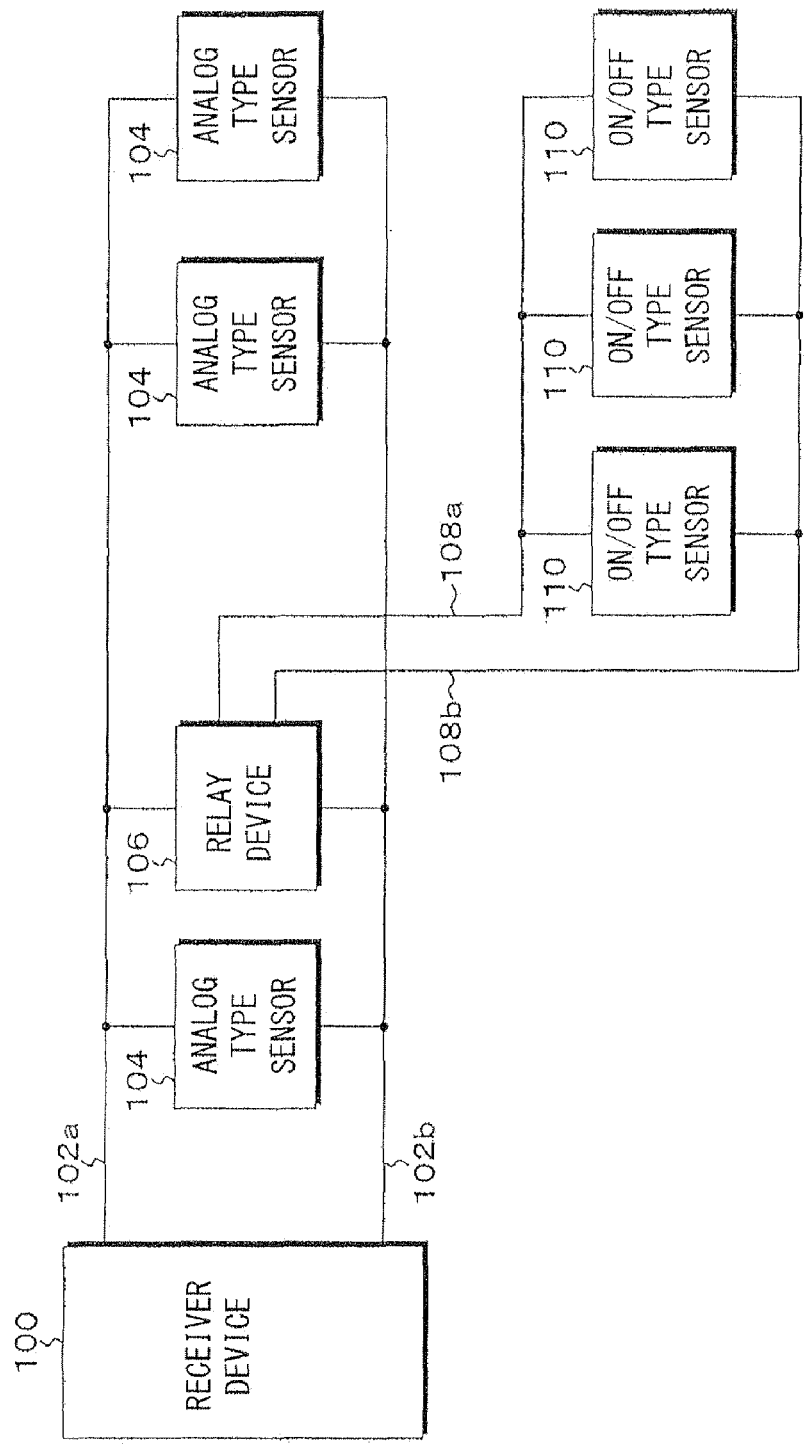
FIG. 15 is a system block diagram showing a conventional monitoring system.
Figure 16:
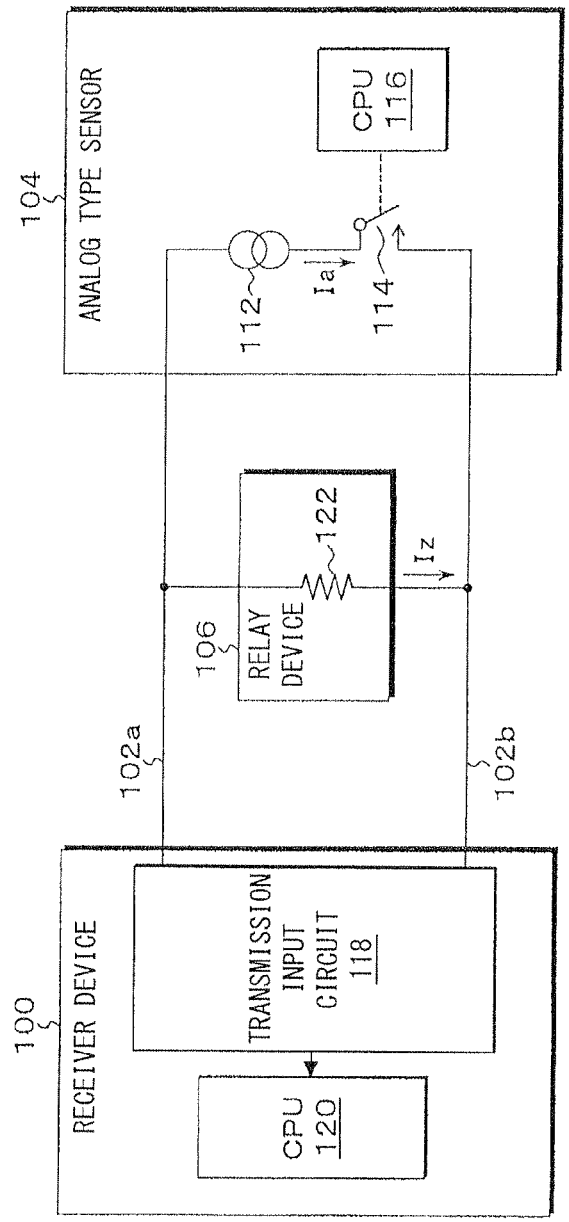
FIG. 16 is a block diagram showing, with an equivalent circuit, a relay device and an analog type sensor in the conventional monitoring system.
Figure 17:
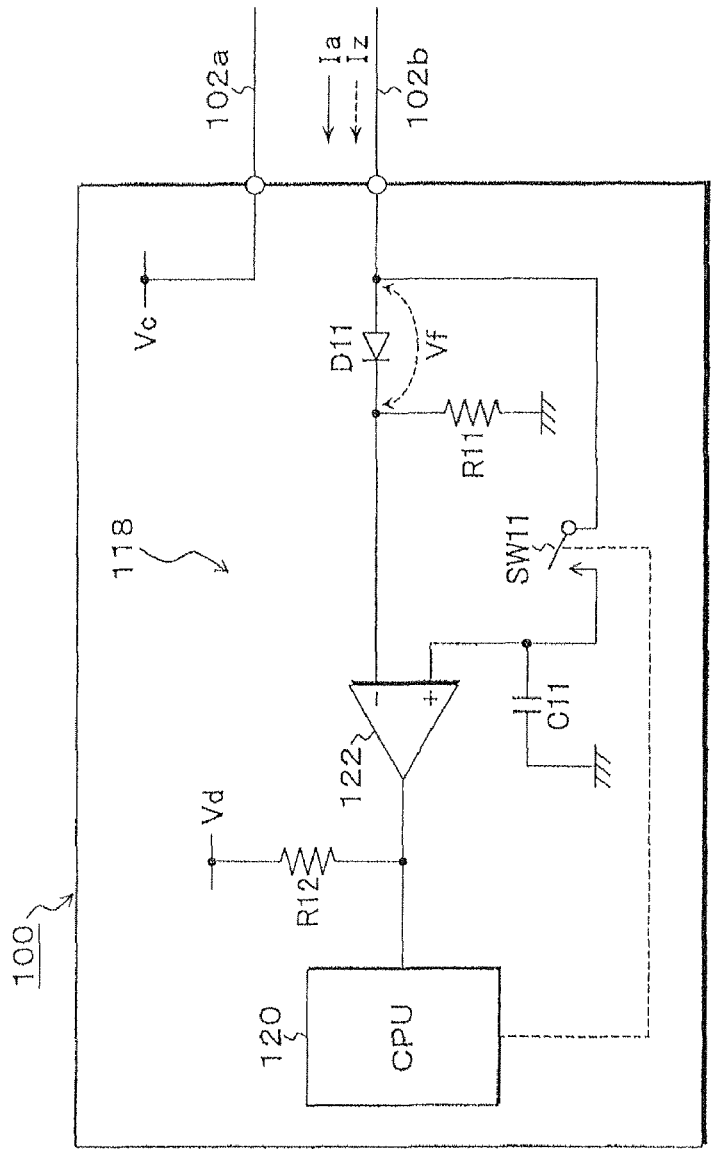
FIG. 17 is a circuit diagram showing a conventional transmission input circuit.
Figure 18:
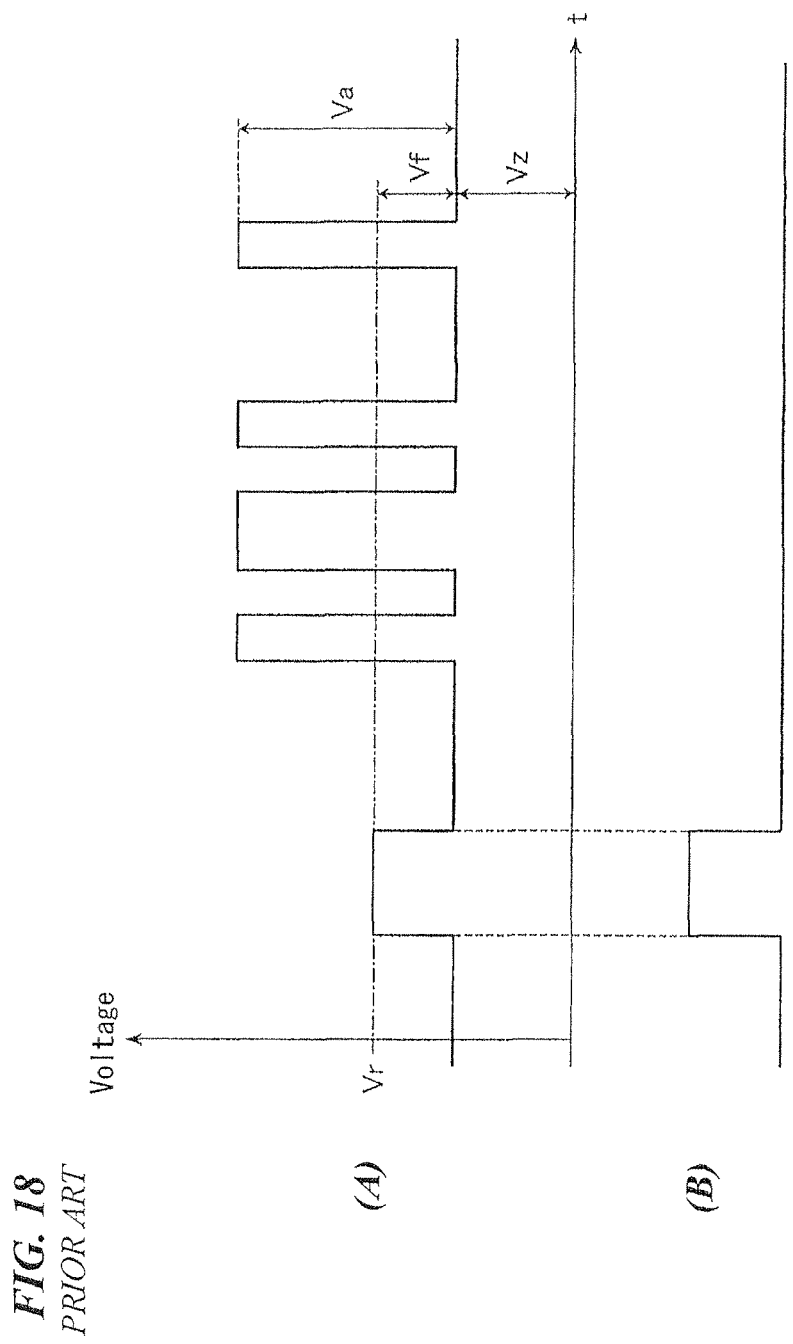
FIG. 18(A) shows the input voltage of the comparator 122 of the conventional transmission input circuit shown in FIG. 17.
FIG. 18(B) shows the timing of sampling of the capacitor C11 performed by the switch SW11 of the conventional transmission input circuit shown in FIG. 17.
Figure 19:
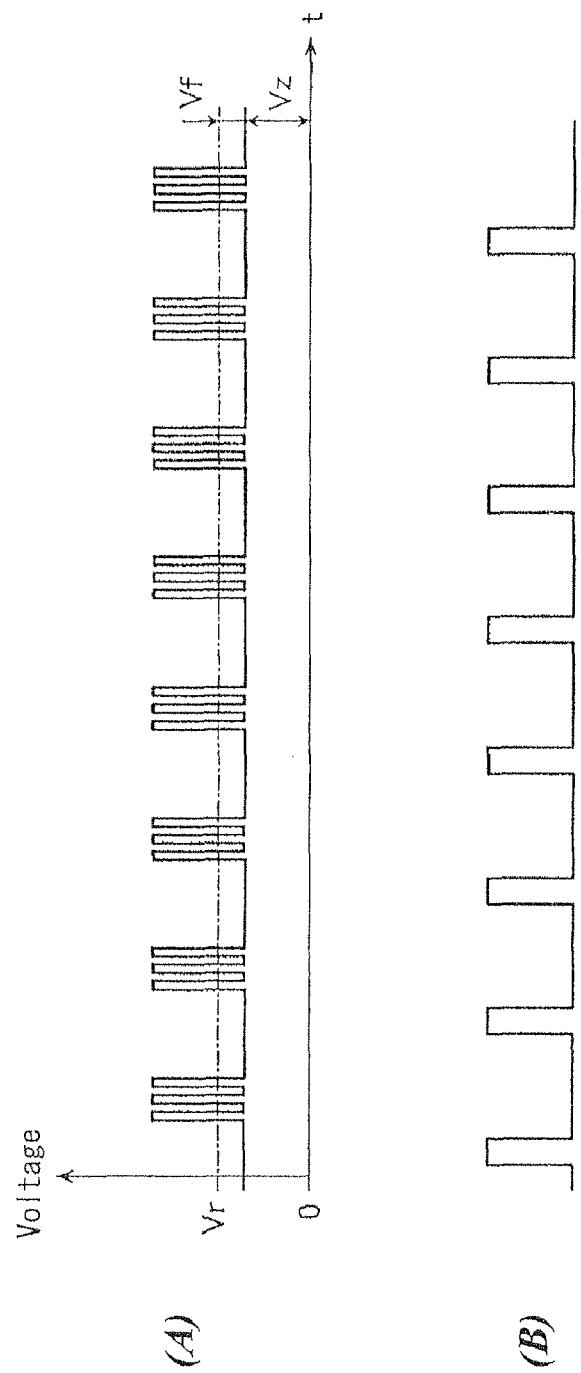
FIG. 19(A) shows the input voltage of the comparator 122 of the conventional transmission input circuit shown in FIG. 17.
FIG. 19(B) shows the sample-hold timing of the conventional transmission input circuit shown in FIG. 17 in a case where load current is stable.

FIG. 14 is a circuit diagram showing a fourth embodiment of a transmission input circuit of the present invention. In the present embodiment, as a device for setting a reference voltage to a comparator 48, there is used a DA converter.

In FIG. 14, basically as with the first embodiment, a transmission input circuit 28 provided in a receiver device 10 is provided with; a current detection resistor R0, a comparator 48, a constant current circuit 50, a switch 52, and a pull-up resistor R5. This differs from the first embodiment in that there is provided a DA converter 78 instead of the digital variable resistor 54 shown in FIG. 2.

With an adjustment processing section 55 provided in a CPU 22, by turning ON the switch 52 at an adjustment timing to flow a reference current Ie from the constant current circuit 50, a digital value with respect to the DA converter 78 is directly set, so that there can be obtained a reference voltage Vr which matches with a target adjustment voltage Vt generated in the current detection resistor R0 (that is, Vt=Vz+Ve).

Also a reference voltage adjustment process of the present embodiment is basically the same as that described with the flow chart of FIG. 5 in the first embodiment, and it differs from that in the first embodiment only in that as the control value in steps S4 and S5 in FIG. 5, the digital value with respect to the DA converter 78 is set to +1 or −1 by a 1-bit unit.

Moreover, also the digital variable resistor used in the first embodiment may be treated as a type of DA converter since it converts a digital value to an analog voltage and outputs it. However, as shown in FIG. 3, the configuration is unique in that the output voltage is adjusted by switching the series resistor array 56, and a circuit which has a configuration other than this and which converts a digital signal to an analog voltage serves as the DA converter 78 shown in FIG. 14.

The respective embodiments above take the relay devices with ON/OFF type fire hazard sensors connected thereto as an example of devices for primarily flowing a load current to transmission lines led out from the receiver device. However, it is not limited to this, and a case of connecting a gas leakage alarm or a theft alarm other than ON/OFF type sensors is also similar to this case.

Moreover, the present invention includes appropriate modifications which do not impair the object and advantage thereof, and further, it is not limited by only the numerical values illustrated in the above respective embodiments.

Industrial Applicability

According to the present invention, it is possible to provide a transmission input circuit in which a threshold voltage for detecting transmission current can be arbitrarily set, and variations associated with temperature or elapse of time will not occur therein, enabling an accurate detection of the presence or absence of transmission current from a slave device.

[Description Of Reference Symbols]

10 Receiver device
12a, 12b Transmission line
14 Analog type sensor
16 Relay device
18a, 18b Sensor line
20 ON/OFF type sensor
22, 38, 44 CPU
24 Transmission circuit section
26 Transmission output circuit
28 Transmission input circuit
30 Display section
32 Operation section
34 Memory section
36 Information transfer section
40 Sensor section
42, 48 Transmission circuit section
46 Alarm receiving section
48 Comparator
50 Constant current circuit
52, 58 Switch device
54 Digital variable resistor
54-1 First digital variable resistor
54-2 Second digital variable resistor
55 Adjustment processing section
56 Series resistor array
60 Up-down counter
62 Nonvolatile memory
64 Control circuit
68 Power supply terminal
70 Ground terminal
72 Wiper terminal
74 First inverter
76 Second inverter
78 AD converter

The invention claimed is:

1. A transmission input circuit of a master device which, in a state where a load current from a load is flowing into a transmission line serving also as a power supply line, detects the presence or absence of a transmission current from a slave device, the transmission input circuit comprising:
a current detection resistor which receives input of a line current flowing through the transmission line and generates a line current detection voltage;
a switch which, by performing switching, allows a predetermined reference current from a constant current circuit to flow to the current detection resistor and generate a threshold voltage;
a digital variable resistor circuit which sets a resistance value according to a digital value to thereby generate an arbitrary reference voltage;
a comparator which receives an input of the line current detection voltage generated by the current detection resistor, to one input terminal, receives an input of the reference voltage generated by the digital variable resistor circuit to an other input terminal, and outputs a component of the line current detection voltage which exceeds the reference voltage, as a transmission current detection signal; and
an adjustment processing section which turns ON the switch at an empty timing where the transmission current from the slave device is not flowing, to allow the reference current to flow from the constant current circuit to the current detection resistor, generates in the current detection resistor a target adjustment voltage, in which a threshold voltage corresponding to the reference current is added to a load current detection voltage corresponding to the load current, and adjusts the digital value so that the reference voltage output from the digital variable resistor matches with the target adjustment voltage.

2. The transmission input circuit according to claim 1, wherein:
the digital variable resistor circuit is provided with a single digital variable resistor having a series resistor array, to both ends of which a predetermined internal power supply voltage is applied, and having a wiper terminal which outputs a voltage input from the adjustment processing section and varied according to the digital value; and
the adjustment processing section adjusts the digital value to be given to the digital variable resistor to a digital value at which the output of the comparator is inverted with a 1-bit change, or to a digital value immediately before the inversion.

3. The transmission input circuit according to claim 2, wherein:
in a case where the output of the comparator at the time of adjustment start is a high level, the adjustment processing section changes the digital value by a 1-bit unit in the direction of inverting this high level to a low level, and adjusts the digital value to be given to the digital variable resistor to a digital value at the time when the high level is inverted to the low level, or to a digital value immediately before the inversion; and
in a case where the output of the comparator at the time of the adjustment start is a low level, the adjustment processing section changes the digital value by a 1-bit unit in the direction of inverting this low level to a high level, and adjusts the digital value to be given to the digital variable resistor to a digital value at the time when the low level is inverted to the high level, or to a digital value immediately before the inversion.

4. The transmission input circuit according to claim 1, wherein
the digital variable resistor circuit is provided with:
a first digital variable resistor for coarse adjustment having a first series resistor array, to both ends of which a predetermined internal power supply voltage is applied, and having a first wiper terminal which outputs a voltage input from the adjustment processing section and varied according to the digital value;
a second digital variable resistor for fine adjustment having a second series resistor array, to both ends of which the predetermined internal power supply voltage is applied, and having a second wiper terminal which outputs a voltage input from the adjustment processing section and varied according to the digital value;
a first resistor provided in a line which connects the first wiper terminal to the other input terminal of the comparator; and
a second resistor which is provided in the line connecting the second wiper terminal to the other input terminal of the comparator, and which has a resistance value greater than that of the first resistor, and wherein
the adjustment processing section
adjusts the digital value to be given to the first digital variable resistor so that the reference voltage and the target adjustment voltage match with each other, and thereafter also adjusts the digital value to be given to the second digital variable resistor so that the reference voltage and the target adjustment voltage match with each other.

5. The transmission input circuit according to claim 4, wherein when adjusting the first digital variable resistor, the adjustment processing section fixes a position of the second wiper terminal of the second digital variable resistor at a middle point position.

6. The transmission input circuit according to claim 1, wherein the digital variable resistor circuit is provided with:
a first digital variable resistor for coarse adjustment having a first series resistor array, to both ends of which a predetermined internal power supply voltage is applied, and having a first wiper terminal which outputs a voltage input from the adjustment processing section and varied according to the digital value;
a second digital variable resistor for fine adjustment having a second series resistor array, to both ends of which the predetermined internal power supply voltage is applied, and having a second wiper terminal which outputs a voltage input from the adjustment processing section and varied according to the digital value;
a first resistor provided in a line which connects the first wiper terminal to the other input terminal of the comparator; and
a second resistor which is provided in the line connecting the second wiper terminal to the other input terminal of the comparator, and which has a resistance value greater than that of the first resistor;
a first inverter, an input of which is connected to the adjustment processing section, and an output of which is connected to a ground side terminal of the second series resistor array;
a second inverter which is input-connected to the output from the first inverter, and which is output-connected, via a third resistor having a resistance value twice that of the second resistor, to the other input terminal of the comparator; and a fourth resistor which is connected between the other input terminal of the comparator and the ground, and which has a resistance value twice that of the second resistor, wherein:

the adjustment processing section adjusts the digital value to be given to the first digital variable resistor so that the reference voltage and the target adjustment voltage match with each other, and thereafter adjusts the digital value to be given to the second digital variable resistor so that the reference voltage and the target adjustment voltage match with each other;

the adjustment processing section also inputs, while adjusting the resistance value of the first digital variable resistor, a low level signal to the first inverter and obtains a high level signal output serving as the internal power supply voltage, to thereby apply the internal power supply voltage to the second resistor via the first digital variable resistor, and forms a circuit which is formed by serially connecting a parallel circuit including the third resistor and the fourth resistor to the second resistor, by connecting the third resistor to the ground side, based on a low level signal output from the second inverter, and thereby setting the voltage at the serial connection point to the same value as the output voltage at the time when the second wiper terminal is positioned at the middle point position; and the adjustment processing section also inputs, while adjusting the resistance value of the second digital variable resistor, a high level signal to the first inverter and obtains a low level signal output, thereby enabling an adjustment while one end of the second digital variable resistor is connected to the ground side, and obtains a high level signal output from the second inverter to form a circuit in which the third resistor and the fourth resistor are serially connected between the internal power supply voltage and the ground, and thereby setting the voltage at the serial connection point between the third resistor and the fourth resistor to a half of the internal power supply voltage.

7. A transmission input circuit of a master device which, in a state where a load current from a load is flowing into a transmission line serving also as a power supply line, detects the presence or absence of transmission current from a slave device, the transmission input circuit comprising:

a current detection resistor which receives input of line current flowing through the transmission line and generates a line current detection voltage;

a switch which, by performing switching, allows a predetermined reference current from a constant current circuit to flow to the current detection resistor and generate a threshold voltage;

a DA converter which generates an arbitrary reference voltage according to a digital value;

a comparator which receives input of the line current detection voltage generated by the current detection resistor, to one input terminal, receives input of the reference voltage generated by the DA converter to an other input terminal, and outputs a component of the line current detection voltage which exceeds the reference voltage, as a transmission current detection signal; and an adjustment processing section which turns ON the switch at an empty timing where the transmission current from the slave device is not flowing, to allow the reference current to flow from the constant current circuit to the current detection resistor, generates in the current detection resistor a target adjustment voltage, in which a threshold voltage corresponding to the reference current is added to the load current detection voltage corresponding to the load current, and adjusts the digital value so that the reference voltage output from the DA converter matches with the target adjustment voltage.

8. The transmission input circuit according to claim 1 or claim 7, wherein the constant current circuit supplies the reference current which generates a threshold voltage being ½ of the transmission current detection voltage corresponding to the transmission current.

* * * * *